United States Patent
McKee et al.

(10) Patent No.: US 10,060,052 B2
(45) Date of Patent: Aug. 28, 2018

(54) FIBROUS ELEMENTS COMPRISING AN ACRYLAMIDE-BASED COPOLYMER AND FIBROUS STRUCTURES EMPLOYING SAME

(71) Applicant: The Procter & Gamble Company, Cincinnati, OH (US)

(72) Inventors: Matthew Gary McKee, Cincinnati, OH (US); Gregory Charles Gordon, Loveland, OH (US); Joerg Kleinwaechter, Loveland, OH (US); Mark Robert Sivik, Mason, OH (US); Paul Dennis Trokhan, Hamilton, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 251 days.

(21) Appl. No.: 14/520,497

(22) Filed: Oct. 22, 2014

(65) Prior Publication Data
US 2015/0114580 A1    Apr. 30, 2015

Related U.S. Application Data

(60) Provisional application No. 61/895,586, filed on Oct. 25, 2013.

(51) Int. Cl.
| | |
|---|---|
| *D01F 8/10* | (2006.01) |
| *D01F 8/18* | (2006.01) |
| *D21H 17/37* | (2006.01) |
| *D21H 17/28* | (2006.01) |
| *D21H 27/30* | (2006.01) |

(Continued)

(52) U.S. Cl.
CPC ............ *D01F 8/10* (2013.01); *C08B 15/005* (2013.01); *C08B 15/10* (2013.01); *C08B 31/003* (2013.01); *C08B 31/006* (2013.01); *C08B 37/003* (2013.01); *C08B 37/0057* (2013.01); *C08L 1/08* (2013.01); *C08L 3/04* (2013.01); *C08L 5/08* (2013.01); *C08L 5/14* (2013.01); *C08L 33/26* (2013.01); *D01D 5/14* (2013.01); *D01F 8/18* (2013.01); *D21H 17/24* (2013.01); *D21H 17/28* (2013.01); *D21H 17/375* (2013.01); *D21H 27/002* (2013.01); *D21H 27/005* (2013.01); *D21H 27/30* (2013.01);

(Continued)

(58) Field of Classification Search
USPC ................ 162/123, 157.1–158, 168.1–168.3
See application file for complete search history.

(56) References Cited

U.S. PATENT DOCUMENTS

| | | | | |
|---|---|---|---|---|
| 4,718,899 A | * | 1/1988 | Itoh ......................... | A61L 15/60 523/111 |
| RE33,355 E | * | 9/1990 | Itoh ........................ | A01G 9/246 106/13 |

(Continued)

FOREIGN PATENT DOCUMENTS

| | | | |
|---|---|---|---|
| WO | WO 2009111000 A1 | * | 9/2009 |
| WO | WO 2013158808 A1 | * | 10/2013 |

OTHER PUBLICATIONS

PCT International Search Report dated Feb. 5, 2015—4 pages.

*Primary Examiner* — Dennis R Cordray
(74) *Attorney, Agent, or Firm* — C. Brant Cook

(57) ABSTRACT

Fibrous elements, for example filaments, containing an acrylamide-based copolymer, fibrous structures employing such fibrous elements, and methods for making same are provided.

18 Claims, 9 Drawing Sheets

(51) Int. Cl.
*D01D 5/14* (2006.01)
*C08B 15/00* (2006.01)
*C08B 15/10* (2006.01)
*C08B 31/00* (2006.01)
*C08B 37/08* (2006.01)
*C08B 37/00* (2006.01)
*D21H 27/00* (2006.01)
*D21H 17/24* (2006.01)
*C08L 1/08* (2006.01)
*C08L 3/04* (2006.01)
*C08L 5/08* (2006.01)
*C08L 5/14* (2006.01)
*C08L 33/26* (2006.01)

(52) U.S. Cl.
CPC ...... *C08L 2205/16* (2013.01); *D10B 2321/08* (2013.01); *D10B 2509/026* (2013.01)

(56) References Cited

U.S. PATENT DOCUMENTS

| | | | | |
|---|---|---|---|---|
| 5,131,982 | A * | 7/1992 | St. John | D21C 5/022 162/168.2 |
| 7,390,565 | B2 * | 6/2008 | Mackey | D01F 6/50 428/364 |
| 7,615,278 | B2 * | 11/2009 | Evers Smith | D01F 6/14 162/157.2 |
| 8,785,361 | B2 * | 7/2014 | Sivik | C11D 17/041 510/296 |
| 2007/0039704 | A1 * | 2/2007 | Cabell | A61L 15/28 162/157.2 |
| 2009/0022983 | A1 * | 1/2009 | Cabell | D04H 5/02 428/338 |
| 2009/0218059 | A1 | 9/2009 | Farwaha et al. | |
| 2012/0052036 | A1 * | 3/2012 | Glenn, Jr. | C11D 17/041 424/70.11 |
| 2013/0280979 | A1 | 10/2013 | McKee | |

* cited by examiner

FIBROUS ELEMENTS COMPRISING AN ACRYLAMIDE-BASED COPOLYMER AND FIBROUS STRUCTURES EMPLOYING SAME

CROSS REFERENCE TO RELATED APPLICATION

This application claims the benefit of U.S. Provisional Application 61/895,586 filed Oct. 25, 2013; which is hereby incorporated by reference in its entirety.

FIELD OF THE INVENTION

The present invention relates to fibrous elements, for example filaments, more particularly polysaccharide filaments, comprising an acrylamide-based copolymer, fibrous structures employing such fibrous elements, and methods for making same.

BACKGROUND OF THE INVENTION

Polysaccharide structures, such as films and fibrous elements, are known in the art. Due to the inherent brittle nature of polysaccharides, structures, such as fibrous elements, made from polysaccahrides exhibit lower than desired strength and/or stretch properties, such as lower than desired dry and wet tensile properties including lower than desired fail total energy absorption ("Fail TEA") properties and lower than desired elongation (stretch) properties. One known way to increase the strength and/or stretch properties of polysaccharide structures is to add a high molecular weight (greater than 500,000 g/mol) polymer, such as a polyacrylamide, which is a homopolymer, compatible with a polysaccharide-containing composition at a concentration greater than the high molecular weight polymer's entanglement concentration. In fact, fibrous elements, for example filaments, comprising polyacrylamide and fibrous structures comprising such fibrous elements are known in the art. A limitation with this strategy is that molecular weight reduction of the high molecular weight polymer, polyacrylamide for example, easily occurs due to mechanical degradation, during processing, such as occurs as a result of shear forces experienced during processing within an extruder, for example a twin screw extruder. As a result, such fibrous elements and fibrous structures exhibit strength and/or stretch properties which fall short of consumers' expectations for such fibrous elements and fibrous structures employing same. For entanglement purposes, it is desirable to use as high molecular weight polymer as possible in the fibrous elements, but due to the degradation of molecular weight during processing, the molecular weight of the high molecular weight polymer, for example polyacrylamide, in the fibrous elements is limited, typically to about 3,500,000 g/mol or less. Therefore, additional means of increasing the strength and/or stretch properties of the fibrous elements and fibrous structures employing such fibrous elements is needed.

Another known method for increasing the strength properties of polysaccharide structures, such as fibrous elements, is to crosslink the polysaccharides molecules of the polysaccharide structure. However, crosslinking between polysaccharide molecules, such as starch molecules, only provides chemical or covalent interactions between the polysaccharide molecules, but does not promote chain entanglement like synthetic, flexible polymers, such as polyacrylamide.

Accordingly, a problem faced by formulators is how to make fibrous elements, for example filaments, and fibrous structures comprising such fibrous elements, exhibit greater strength and/or stretch properties compared to the known fibrous elements and fibrous structures comprising such fibrous elements described above.

Therefore, there is a need for fibrous elements, for example filaments, and fibrous structures employing such fibrous elements that exhibit improved strength and/or stretch properties compared to the known fibrous elements comprising polyacrylamide and fibrous structures comprising such fibrous elements.

SUMMARY OF THE INVENTION

The present invention fulfills the need described above by providing fibrous elements comprising an acrylamide-based copolymer, for example filaments, that exhibit strength and/or stretch properties greater than the strength and/or stretch properties (as represented by the Fail TEA and Elongation at Rupture (EAR), respectively, of the fibrous elements and of the fibrous structures employing such fibrous elements) of fibrous elements comprising polyacrylamide, and fibrous structures employing such fibrous elements.

One solution to the problem identified above is a fibrous element, for example a filament, comprising an acrylamide-based copolymer derived from two or more different monomers, and fibrous structures employing such fibrous elements such that the fibrous elements and fibrous structures exhibit strength and/or stretch properties greater than fibrous elements comprising polyacrylamide, and fibrous structures employing such fibrous elements.

It has unexpectedly been found that by combining the entanglement properties of high molecular weight polymers and crosslinking methods, improved strength and/or stretch properties within the fibrous elements of the present invention and fibrous structures employing such fibrous elements can be achieved. In particular, it is been found that the addition of a high molecular weight polymer, for example a high molecular weight polymer that comprises a functional group that is able to participate in a crosslinking reaction with a hydroxyl polymer, such as a polysaccharide, to a hydroxyl polymer-containing composition increases the strength and stretch properties of fibrous elements and/or fibrous structure comprising the fibrous element made from the composition. To be clear, the high molecular weight polymer is a polymer, for example a copolymer that is able to form both entanglements and chemical crosslinks with a hydroxyl polymer, such as a polysaccharide matrix. The repeat unit of the copolymer which contains the functional group capable of participating in the crosslinking reaction also may contain a non-polar group that can form reversible, hydrophobic associations in an aqueous solution, such as an aqueous solution comprising hydroxyl polymer. It is well known in the art that chain scission of polymers under mechanical forces limits the performance of these materials in applications where it is critical to maintain high molecular weight. In fact, a lot of work has focused on understanding the mechanism of mechanical degradation, and how to improve the stability of polymers under shear and elongational stresses. The hydrophobic-hydrophobic interactions between copolymer chains are also susceptible to breaking under mechanical stress, however unlike covalent bonds they are capable of reforming after breaking. Thus the hydrophobic associations serve as a reversible mechanism to maintain an effective polymer molecular weight in the presence of high shear and elongational stresses. In the present invention, maintaining a polymer with a high effective chain length through the melt processing step will result in fibrous elements and fibrous structures containing such fibrous elements exhibiting improved strength and/or stretch properties.

In one example of the present invention, a fibrous element comprising a filament-forming polymer and an acrylamide-based copolymer comprising two or more different monomeric units, at least one of which is an acrylamide monomeric unit and at least one of which is a monomeric unit selected from the group consisting of: pendant hydroxyl-containing monomeric units, pendant hydroxyl alkylether-containing monomeric units, pendant hydroxyl alkylester-containing monomeric units, pendant hydroxyl alkylamide-containing monomeric units, and mixtures thereof, is provided. The respective monomeric units may be derived from their respective monomers.

In another example of the present invention, a fibrous element comprising a filament-forming polymer and an acrylamide-based copolymer comprising an acrylamide monomeric unit wherein the fibrous element exhibits an EAR of greater than 55% and/or greater than 60% and/or greater than 70% and/or greater than 80% and/or about 87% as measured according to the Elongation at Rupture Test Method described herein, is provided.

In still another example of the present invention, a fibrous structure comprising a plurality of fibrous elements comprising a filament-forming polymer and an acrylamide-based copolymer comprising an acrylamide monomeric unit wherein the fibrous structure exhibits a Fail TEA of greater than 37 g/in and/or greater than 40 g/in and/or greater than 45 g/in and/or greater than 50 g/in and/or greater than 55 g/in as measured according to the Elongation/Tensile Strength/TEA/Tangent Modulus Test Method described herein, is provided.

In still yet another example of the present invention, a fibrous structure comprising a plurality of fibrous elements according to the present invention is provided.

In even still yet another example of the present invention, a single- or multi-ply sanitary tissue product comprising a fibrous structure according to the present invention is provided.

In even yet another example of the present invention, a method for making a fibrous element according to the present invention wherein the method comprises the steps of:
 a. providing a filament-forming composition comprising a filament-forming polymer, an acrylamide monomer and a monomer selected from the group consisting of: pendant hydroxyl-containing monomers, pendant hydroxyl alkylether-containing monomers, pendant hydroxyl alkylester-containing monomers, pendant hydroxyl alkylamide-containing monomers, and mixtures thereof; and
 b. producing a fibrous element from the filament-forming composition, is provided.

In yet another example of the present invention, a method for making a fibrous element according to the present invention wherein the method comprises the steps of:
 a. providing a filament-forming composition comprising a filament-forming polymer, and an acrylamide-based copolymer comprising two or more different monomeric units, at least one of which is an acrylamide monomeric unit and at least one of which is a monomeric unit selected from the group consisting of: pendant hydroxyl-containing monomeric units, pendant hydroxyl alkylether-containing monomeric units, pendant hydroxyl alkylester-containing monomeric units, pendant hydroxyl alkylamide-containing monomeric units, and mixtures thereof; and
 b. producing a fibrous element from the filament-forming composition, is provided.

In still yet another example of the present invention, a method for making a fibrous element according to the present invention, wherein the method comprises the steps of:
 a. providing a filament-forming composition comprising a filament-forming polymer, an acrylamide-based copolymer comprising an acrylamide monomeric unit; and
 b. producing a fibrous element from the filament-forming composition is provided.

Accordingly, the present invention provides a fibrous element comprising an acrylamide-based copolymer comprising two or more different monomeric units at least one of which is an acrylamide monomeric unit, a fibrous structure comprising a plurality of such fibrous elements, and methods for making same.

DETAILED DESCRIPTION OF THE INVENTION

Definitions

Figure 1:
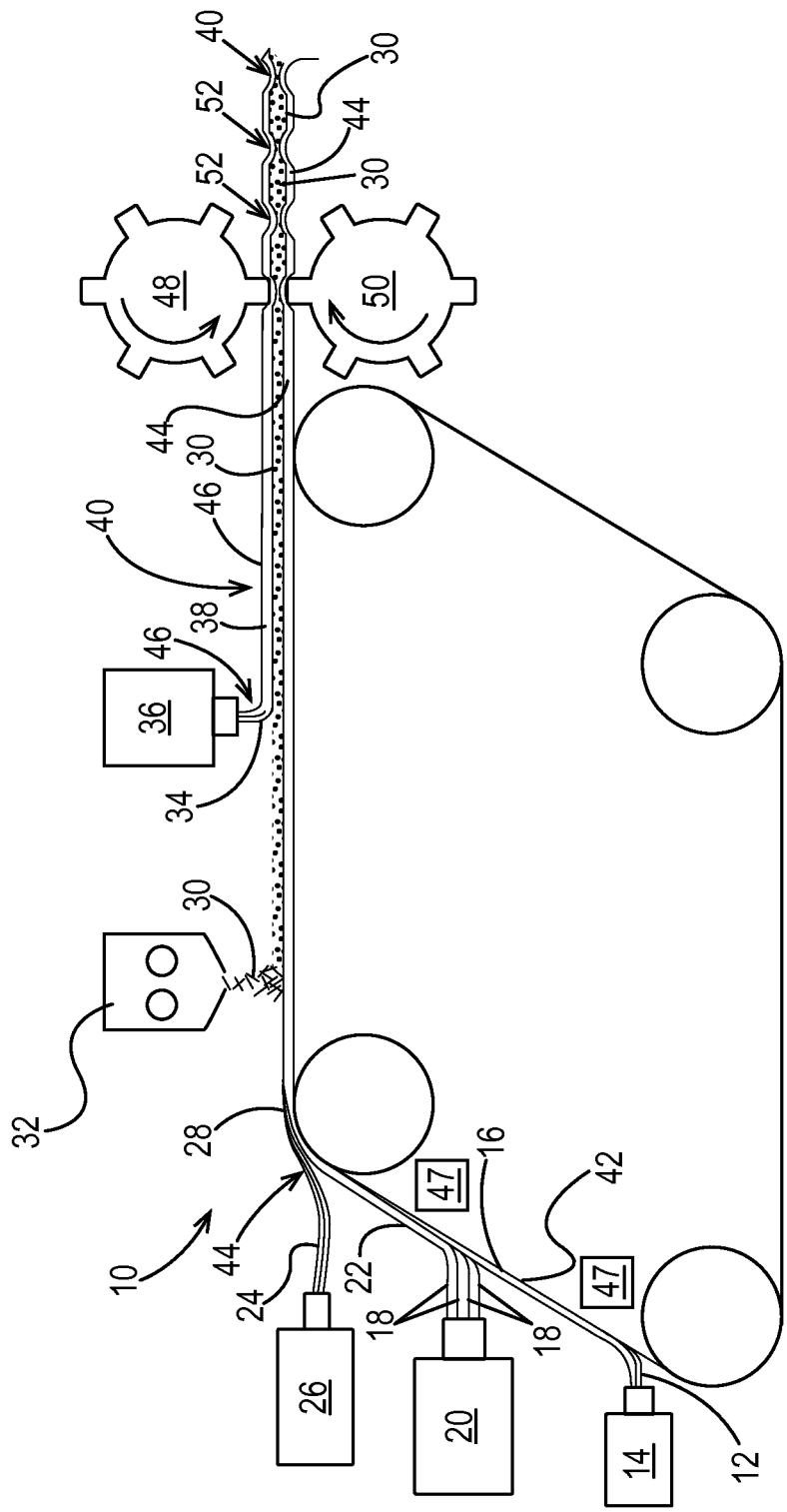
FIG. 1 is a schematic representation of one example of a method for making a fibrous structure according to the present invention.

"Copolymer" as used herein means a polymer comprising two or more different monomeric units. In other words, the copolymer is derived from two or more different monomers. For example, the copolymer may comprise two different monomeric units. In another example, the copolymer may comprise three different monomeric units (terpolymer). In still another example, the copolymer may comprise more than three different monomeric units. The monomeric units may be introduced into the polymerization in any order. The copolymer of the present invention may be produced by any suitable polymerization process, for example a free radical polymerization, for example a random free-radical polymerization and/or living free-radical polymerization. The polymerization may be random or controlled by several means including, but not limited to, atom transfer radical polymerization (ATRP) and reversible addition-fragmentation chain-transfer polymerization (RAFT). In one example, the polymerization is an emulsion polymerization.

"Fibrous structure" as used herein means a structure that comprises one or more fibrous elements. In one example, a fibrous structure according to the present invention means an association of fibrous elements that together form a structure capable of performing a function.

Non-limiting examples of processes for making fibrous structures include known wet-laid papermaking processes, air-laid papermaking processes, and wet, solution, and dry filament spinning processes, for example meltblowing and spunbonding spinning processes that are typically referred to as nonwoven processes. Further processing of the formed fibrous structure may be carried out such that a finished fibrous structure is formed. For example, in typical papermaking processes, the finished fibrous structure is the fibrous structure that is wound on the reel at the end of papermaking. The finished fibrous structure may subsequently be converted into a finished product, e.g. a sanitary tissue product.

"Fibrous element" as used herein means an elongate particulate having a length greatly exceeding its average diameter, i.e. a length to average diameter ratio of at least about 10. A fibrous element may be a filament or a fiber. In one example, the fibrous element is a single fibrous element rather than a yarn comprising a plurality of fibrous elements.

The fibrous elements of the present invention may be spun from polymer melt compositions via suitable spinning operations, such as meltblowing and/or spunbonding and/or they may be obtained from natural sources such as vegetative sources, for example trees.

The fibrous elements of the present invention may be monocomponent and/or multicomponent. For example, the fibrous elements may comprise bicomponent fibers and/or filaments. The bicomponent fibers and/or filaments may be in any form, such as side-by-side, core and sheath, islands-in-the-sea and the like.

"Filament" as used herein means an elongate particulate as described above that exhibits a length of greater than or equal to 5.08 cm (2 in.) and/or greater than or equal to 7.62 cm (3 in.) and/or greater than or equal to 10.16 cm (4 in.) and/or greater than or equal to 15.24 cm (6 in.).

Filaments are typically considered continuous or substantially continuous in nature. Filaments are relatively longer than fibers. Non-limiting examples of filaments include meltblown and/or spunbond filaments. Non-limiting examples of polymers that can be spun into filaments include natural polymers, such as starch, starch derivatives, cellulose, such as rayon and/or lyocell, and cellulose derivatives, hemicellulose, hemicellulose derivatives, and synthetic polymers including, but not limited to polyvinyl alcohol, thermoplastic polymer, such as polyesters, nylons, polyolefins such as polypropylene filaments, polyethylene filaments, and biodegradable thermoplastic fibers such as polylactic acid filaments, polyhydroxyalkanoate filaments, polyesteramide filaments and polycaprolactone filaments.

"Fiber" as used herein means an elongate particulate as described above that exhibits a length of less than 5.08 cm (2 in.) and/or less than 3.81 cm (1.5 in.) and/or less than 2.54 cm (1 in.).

Fibers are typically considered discontinuous in nature. Non-limiting examples of fibers include pulp fibers, such as wood pulp fibers, and synthetic staple fibers such as polypropylene, polyethylene, polyester, copolymers thereof, rayon, glass fibers and polyvinyl alcohol fibers.

Staple fibers may be produced by spinning a filament tow and then cutting the tow into segments of less than 5.08 cm (2 in.) thus producing fibers.

In one example of the present invention, a fiber may be a naturally occurring fiber, which means it is obtained from a naturally occurring source, such as a vegetative source, for example a tree and/or plant. Such fibers are typically used in papermaking and are oftentimes referred to as papermaking fibers. Papermaking fibers useful in the present invention include cellulosic fibers commonly known as wood pulp fibers. Applicable wood pulps include chemical pulps, such as Kraft, sulfite, and sulfate pulps, as well as mechanical pulps including, for example, groundwood, thermomechanical pulp and chemically modified thermomechanical pulp. Chemical pulps, however, may be preferred since they impart a superior tactile sense of softness to fibrous structures made therefrom. Pulps derived from both deciduous trees (hereinafter, also referred to as "hardwood") and coniferous trees (hereinafter, also referred to as "softwood") may be utilized. The hardwood and softwood fibers can be blended, or alternatively, can be deposited in layers to provide a stratified web. Also applicable to the present invention are fibers derived from recycled paper, which may contain any or all of the above categories of fibers as well as other non-fibrous polymers such as fillers, softening agents, wet and dry strength agents, and adhesives used to facilitate the original papermaking.

In addition to the various wood pulp fibers, other cellulosic fibers such as cotton linters, rayon, lyocell, and bagasse fibers can be used in the fibrous structures of the present invention.

"Sanitary tissue product" as used herein means a soft, relatively low density fibrous structure useful as a wiping implement for post-urinary and post-bowel movement cleaning (toilet tissue), for otorhinolaryngological discharges (facial tissue), multi-functional absorbent and cleaning uses (absorbent towels) and wipes, such as wet and dry wipes. The sanitary tissue product may be convolutedly wound upon itself about a core or without a core to form a sanitary tissue product roll or may be in the form of discrete sheets.

In one example, the sanitary tissue product of the present invention comprises one or more fibrous structures according to the present invention. The fibrous structure and/or sanitary tissue products may be embossed.

The sanitary tissue products and/or fibrous structures of the present invention may exhibit a basis weight between about 10 $g/m^2$ to about 120 $g/m^2$ and/or from about 15 $g/m^2$ to about 110 $g/m^2$ and/or from about 20 $g/m^2$ to about 100 $g/m^2$ and/or from about 30 to 90 $g/m^2$ as determined by the Basis Weight Test Method described herein. In addition, the sanitary tissue product of the present invention may exhibit a basis weight between about 40 $g/m^2$ to about 120 $g/m^2$ and/or from about 50 $g/m^2$ to about 110 $g/m^2$ and/or from about 55 $g/m^2$ to about 105 $g/m^2$ and/or from about 60 $g/m^2$ to 100 $g/m^2$ as determined by the Basis Weight Test Method described herein.

The sanitary tissue products of the present invention may exhibit a total dry tensile strength of greater than about 59 g/cm (150 g/in) and/or from about 78 g/cm (200 g/in) to about 394 g/cm (1000 g/in) and/or from about 98 g/cm (250 g/in) to about 335 g/cm (850 g/in). In addition, the sanitary tissue product of the present invention may exhibit a total dry tensile strength of greater than about 196 g/cm (500 g/in) and/or from about 196 g/cm (500 g/in) to about 394 g/cm (1000 g/in) and/or from about 216 g/cm (550 g/in) to about 335 g/cm (850 g/in) and/or from about 236 g/cm (600 g/in) to about 315 g/cm (800 g/in). In one example, the sanitary tissue product exhibits a total dry tensile strength of less than about 394 g/cm (1000 g/in) and/or less than about 335 g/cm (850 g/in) as measured according to the Elongation/Tensile Strength/TEA/Tangent Modulus Test Method described herein.

The sanitary tissue products of the present invention may exhibit an initial total wet tensile strength of less than about 78 g/cm (200 g/in) and/or less than about 59 g/cm (150 g/in) and/or less than about 39 g/cm (100 g/in) and/or less than about 29 g/cm (75 g/in) and/or less than about 23 g/cm (60 g/in) as measured according to the Initial Total Wet Tensile Test Method described herein.

The sanitary tissue products of the present invention may exhibit an initial total wet tensile strength of greater than about 118 g/cm (300 g/in) and/or greater than about 157 g/cm (400 g/in) and/or greater than about 196 g/cm (500 g/in) and/or greater than about 236 g/cm (600 g/in) and/or greater than about 276 g/cm (700 g/in) and/or greater than about 315 g/cm (800 g/in) and/or greater than about 354 g/cm (900 g/in) and/or greater than about 394 g/cm (1000 g/in) and/or from about 118 g/cm (300 g/in) to about 1968 g/cm (5000 g/in) and/or from about 157 g/cm (400 g/in) to about 1181 g/cm (3000 g/in) and/or from about 196 g/cm (500 g/in) to about 984 g/cm (2500 g/in) and/or from about 196 g/cm (500 g/in) to about 787 g/cm (2000 g/in) and/or from about 196 g/cm (500 g/in) to about 591 g/cm (1500 g/in) as measured according to the Initial Total Wet Tensile Test Method described herein.

The sanitary tissue products of the present invention may exhibit a density of less than 0.60 g/cm$^3$ and/or less than 0.30 g/cm$^3$ and/or less than 0.20 g/cm$^3$ and/or less than 0.15 g/cm$^3$ and/or less than 0.10 g/cm$^3$ and/or less than 0.07 g/cm$^3$ and/or less than 0.05 g/cm$^3$ and/or from about 0.01 g/cm$^3$ to about 0.20 g/cm$^3$ and/or from about 0.02 g/cm$^3$ to about 0.15 g/cm$^3$ and/or from about 0.02 g/cm$^3$ to about 0.10 g/cm$^3$.

The sanitary tissue products of the present invention may be in the form of sanitary tissue product rolls. Such sanitary tissue product rolls may comprise a plurality of connected, but perforated sheets of fibrous structure, that are separably dispensable from adjacent sheets.

The sanitary tissue products of the present invention may comprise additives such as softening agents, temporary wet strength agents, permanent wet strength agents, bulk softening agents, lotions, silicones, wetting agents, latexes, patterned latexes and other types of additives suitable for inclusion in and/or on sanitary tissue products.

"Scrim" as used herein means a material that is used to overlay solid additives within the fibrous structures of the present invention such that the solid additives are positioned between the scrim and a layer of the fibrous structure. In one example, the scrim covers the solid additives such that they are positioned between the scrim and the nonwoven substrate of the fibrous structure. In another example, the scrim is a minor component relative to the nonwoven substrate of the fibrous structure.

"Hydroxyl polymer" as used herein includes any hydroxyl-containing polymer that can be incorporated into a fibrous structure of the present invention, such as into a fibrous structure in the form of a fibrous element. In one example, the hydroxyl polymer of the present invention includes greater than 10% and/or greater than 20% and/or greater than 25% by weight hydroxyl moieties. In another example, the hydroxyl within the hydroxyl-containing polymer is not part of a larger functional group such as a carboxylic acid group.

"Non-thermoplastic" as used herein means, with respect to a material, such as a fibrous element as a whole and/or a polymer within a fibrous element, that the fibrous element and/or polymer exhibits no melting point and/or softening point, which allows it to flow under pressure, in the absence of a plasticizer, such as water, glycerin, sorbitol, urea and the like.

"Thermoplastic" as used herein means, with respect to a material, such as a fibrous element as a whole and/or a polymer within a fibrous element, that the fibrous element and/or polymer exhibits a melting point and/or softening point at a certain temperature, which allows it to flow under pressure.

"Non-cellulose-containing" as used herein means that less than 5% and/or less than 3% and/or less than 1% and/or less than 0.1% and/or 0% by weight of cellulose polymer, cellulose derivative polymer and/or cellulose copolymer is present in fibrous element. In one example, "non-cellulose-containing" means that less than 5% and/or less than 3% and/or less than 1% and/or less than 0.1% and/or 0% by weight of cellulose polymer is present in fibrous element.

"Fast wetting surfactant" as used herein means a surfactant that exhibits a Critical Micelle Concentration of greater 0.15% by weight and/or at least 0.25% and/or at least 0.50% and/or at least 0.75% and/or at least 1.0% and/or at least 1.25% and/or at least 1.4% and/or less than 10.0% and/or less than 7.0% and/or less than 4.0% and/or less than 3.0% and/or less than 2.0% by weight.

"Aqueous polymer melt composition" as used herein means a composition comprising water and a melt processed polymer, such as a melt processed filament-forming polymer, for example a melt processed hydroxyl polymer.

"Melt processed filament-forming polymer" as used herein means any polymer, which by influence of elevated temperatures, pressure and/or external plasticizers may be softened to such a degree that it can be brought into a flowable state, and in this condition may be shaped as desired.

"Melt processed hydroxyl polymer" as used herein means any polymer that contains greater than 10% and/or greater than 20% and/or greater than 25% by weight hydroxyl groups and that has been melt processed, with or without the aid of an external plasticizer. More generally, melt processed hydroxyl polymers include polymers, which by the influence of elevated temperatures, pressure and/or external plasticizers may be softened to such a degree that they can be brought into a flowable state, and in this condition may be shaped as desired.

"Blend" as used herein means that two or more materials, such as a filament-forming polymer, for example a hydroxyl polymer, and a non-hydroxyl polymer and/or a fast wetting surfactant are in contact with each other, such as mixed together homogeneously or non-homogeneously, within a polymeric structure, such as a fibrous element. In other words, a polymeric structure, such as a fibrous element, formed from one material, but having an exterior coating of another material is not a blend of materials for purposes of the present invention. However, a fibrous element formed from two different materials is a blend of materials for purposes of the present invention even if the fibrous element further comprises an exterior coating of a material.

"Associate," "Associated," "Association," and/or "Associating" as used herein with respect to fibrous elements means combining, either in direct contact or in indirect contact, fibrous elements such that a fibrous structure is formed. In one example, the associated fibrous elements may be bonded together for example by adhesives and/or thermal bonds. In another example, the fibrous elements may be associated with one another by being deposited onto the same fibrous structure making belt.

"Weight average molecular weight" as used herein means the weight average molecular weight as determined using gel permeation chromatography as generally described in Colloids and Surfaces A. Physico Chemical & Engineering Aspects, Vol. 162, 2000, pg. 107-121 and detailed in the Weight Average Molecular Weight Test Method described herein.

"Average Diameter" as used herein, with respect to a fibrous element, is measured according to the Average Diameter Test Method described herein. In one example, a fibrous element of the present invention exhibits an average diameter of less than 50 μm and/or less than 25 μm and/or less than 20 μm and/or less than 15 μm and/or less than 10 μm and/or less than 6 μm and/or greater than 1 μm and/or greater than 3 μm as measured according to the Average Diameter Test Method described herein.

"Basis Weight" as used herein is the weight per unit area of a sample reported in lbs/3000 ft$^2$ or g/m$^2$ as determined by the Basis Weight Test Method described herein.

"Machine Direction" or "MD" as used herein means the direction parallel to the flow of the fibrous structure through a fibrous structure making machine and/or sanitary tissue product manufacturing equipment. Typically, the MD is substantially perpendicular to any perforations present in the fibrous structure "Cross Machine Direction" or "CD" as used herein means the direction perpendicular to the machine direction in the same plane of the fibrous structure and/or sanitary tissue product comprising the fibrous structure.

"Ply" or "Plies" as used herein means an individual fibrous structure optionally to be disposed in a substantially contiguous, face-to-face relationship with other plies, forming a multiple ply fibrous structure. It is also contemplated that a single fibrous structure can effectively form two "plies" or multiple "plies", for example, by being folded on itself.

As used herein, the articles "a" and "an" when used herein, for example, "an anionic surfactant" or "a fiber" is understood to mean one or more of the material that is claimed or described.

All percentages and ratios are calculated by weight unless otherwise indicated. All percentages and ratios are calculated based on the total composition unless otherwise indicated.

Unless otherwise noted, all component or composition levels are in reference to the active level of that component or composition, and are exclusive of impurities, for example, residual solvents or by-products, which may be present in commercially available sources.

Acrylamide-Based Copolymer

The acrylamide-based copolymer of the present invention comprises two or more different monomeric units. In one example, the acrylamide-based copolymer's monomeric units are derived from two or more different monomers. In one example, the acrylamide-based copolymer of the present invention is derived from an acrylamide monomer and at least one monomer selected from the group consisting of: pendant hydroxyl-containing monomers, pendant hydroxyl alkylether-containing monomers, pendant hydroxyl alkylester-containing monomers, pendant hydroxyl alkylamide-containing monomers, and mixtures thereof. In one example, the acrylamide-based copolymer of the present invention comprises an acrylamide monomeric unit, for example derived from an acrylamide monomer, and at least one monomeric unit selected from the group consisting of: pendant hydroxyl-containing monomeric units, pendant hydroxyl alkylether-containing monomeric units, pendant hydroxyl alkylester-containing monomeric units, pendant hydroxyl alkylamide-containing monomeric units, and mixtures thereof.

In one example, the acrylamide-based copolymer of the present invention exhibits a weight ratio of acrylamide monomeric unit to the total level of pendant hydroxyl-containing monomeric unit and pendant hydroxyl alkylether-containing monomeric unit and pendant hydroxyl alkylester-containing monomeric unit and pendant hydroxyl alkylamide-containing monomeric unit of at least 99.9:0.1 to about 30:70 and/or from about 99:1 to about 50:50.

In another example, the acrylamide-based copolymer of the present invention exhibits a weight ratio of acrylamide monomeric unit to pendant hydroxyl-containing monomeric unit of at least 99.9:0.1 to about 30:70 and/or from about 99:1 to about 50:50.

In one example, the acrylamide-based copolymer of the present invention exhibits a weight ratio of acrylamide monomeric unit to pendant hydroxyl alkylether-containing monomeric unit of at least 99.9:0.1 to about 30:70 and/or from about 99:1 to about 50:50.

In one example, the acrylamide-based copolymer of the present invention exhibits a weight ratio of acrylamide monomeric unit to pendant hydroxyl alkylester-containing monomeric unit of at least 99.9:0.1 to about 30:70 and/or from about 99:1 to about 50:50.

In one example, the acrylamide-based copolymer of the present invention exhibits a weight ratio of acrylamide monomeric unit to pendant hydroxyl alkylamide-containing monomeric unit at a weight ratio of at least 99.9:0.1 to about 30:70 and/or from about 99:1 to about 50:50.

In one example, the acrylamide-based copolymer of the present invention comprises two or more different monomeric units selected from the group consisting of: pendant hydroxyl-containing monomeric units, pendant hydroxyl alkylether-containing monomeric units, pendant hydroxyl alkylester-containing monomeric units, pendant hydroxyl alkylamide-containing monomeric units.

In one example, the acrylamide-based copolymer of the present invention comprises two or more different pendant hydroxyl-containing monomeric units.

In one example, the acrylamide-based copolymer of the present invention comprises two or more different pendant hydroxyl alkylether-containing monomeric units.

In one example, the acrylamide-based copolymer of the present invention comprises two or more different pendant hydroxyl alkylester-containing monomeric units.

In one example, the acrylamide-based copolymer of the present invention comprises two or more different pendant hydroxyl alkylamide-containing monomeric units.

In one example, the acrylamide-based copolymer of the present invention comprises at least one pendant hydroxyl-containing monomeric unit and at least one pendant hydroxyl alkylether-containing monomeric unit.

In one example, the acrylamide-based copolymer of the present invention comprises at least one pendant hydroxyl-containing monomeric unit and at least one pendant hydroxyl alkylester-containing monomeric unit.

In one example, the acrylamide-based copolymer of the present invention comprises at least one pendant hydroxyl-containing monomeric unit and at least one pendant hydroxyl alkylamide-containing monomeric unit.

In one example, the acrylamide-based copolymer of the present invention exhibits a weight average molecular weight of greater than 1,400,000 g/mol and/or greater than 2,000,000 g/mol and/or greater than 2,500,000 g/mol and/or greater than 3,000,000 g/mol and/or greater than 5,000,000 g/mol and/or less than 10,000,000 g/mol and/or less than 8,000,000 g/mol and/or less than 7,000,000 g/mol and/or less than 6,000,000 as determined by the Weight Average Molecular Weight Test Method described herein.

In another example, the acrylamide-based copolymer of the present invention exhibits a polydispersity of greater than 1.10 and/or at least 1.20 and/or at least 1.30 and/or at least 1.32 and/or at least 1.33 and/or at least 1.35 and/or at least 1.40 and/or at least 1.45.

In yet another example, the acrylamide-based copolymer of the present invention is a linear polymer. In another example, the acrylamide-based copolymer of the present invention is a long chain branched polymer.

In still another example, the acrylamide-based copolymer of the present invention may be a random copolymer and/or a block copolymer. For example an acrylamide-based copolymer of the present invention may be made from two monomers, for example an acrylamide monomer ("G") and a pendant hydroxyl-containing monomer ("H"), such that G and H are randomly distributed in the copolymer, such as
  GHGGHGGGGHHG etc.
or G and H can be in repeating distributions in the copolymer, for example
  GHGHGHGHGHGH etc.,
  or
  GGGGGHHGGGGHH etc., The same is true of a terpolymer of the present invention, the distribution of the three different monomers can be either random or repeating.

Acrylamide Monomeric Unit

The acrylamide monomeric unit of the acrylamide-based copolymer promotes compatibility with the filament-forming polymer, such as starch, resulting in substantially compatible phases. "Substantially compatible" means that the non-hydroxyl polymer, such as polyacrylamide, and/or acrylamide-based copolymer of the present invention does not exist as a separate polymer phase from the filament-forming polymer, such as the hydroxyl polymer. In other words, the non-hydroxyl polymer, such as polyacrylamide, and/or the acrylamide-based copolymer are sufficiently compatible with the hydroxyl polymer to produce a fibrous element according to the present invention. The molecular weight of a suitable non-hydroxyl polymer and/or acrylamide-based copolymer of the present invention should be sufficiently high to effectuate entanglements thus increasing the melt strength of the aqueous polymer melt composition in which it is present, and preventing melt fracture during spinning of the aqueous polymer melt composition to produce fibrous elements.

In one example, the acrylamide monomeric unit has the following Formula I:

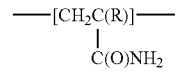

wherein R is independently selected from the group consisting of: H and $C_1$-$C_3$ alkyl.

Pendant Hydroxyl-Containing Monomeric Unit

The hydroxyl-containing monomeric unit serves as a reactive group to participate in the cross-linking reaction. It is believed that the pendant hydroxyl groups of the acrylamide based copolymer readily react with the crosslinking agent in the filament upon curing thereby creating chemical crosslinks that can either couple an acrylamide-based copolymer chain and a hydroxyl polymer chain, such as a polysaccharide chain, or two acrylamide-based copolymer chains. It is believed that a stronger network structure would result from crosslinking a flexible, high molecular weight polymer with a reactive functional group, such as the acrylamide-based copolymer, with a hydroxyl polymer matrix, such as a polysaccharide matrix, compared to the resulting fibrous structure formed from crosslinking a hydroxyl polymer matrix, such as a polysaccharide matrix, in the absence of such a high molecular weight polymer with a reactive functional group, such as the acrylamide-based copolymer. An interpenetrating network structure is formed through a combination of entanglements and chemical crosslinks between the acrylamide-based copolymer and the hydroxyl polymer, for example, the polysaccharide. The resulting filaments possess a higher elongation at rupture, and the resulting fibrous structures possess improved tensile strength and fail stretch (elongation). In one example, the pendant hydroxyl-containing monomeric unit has the following Formula II:

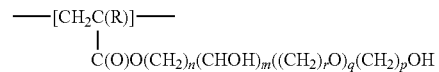

wherein R is independently selected from the group consisting of: H and $C_1$-$C_3$ alkyl, n is from 1-10, m is from 0 to 4, p is from 0 to 10, q is from 0 to 10, and r is from 1-4.

In another example, the pendant hydroxyl-containing monomeric unit has the following Formula III:

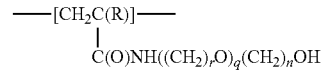

wherein R is independently selected from the group consisting of: H and $C_1$-$C_3$ alkyl, n is from 1-10, q is from 0 to 10, and r is from 1-4.

Non-limiting examples of suitable pendant hydroxyl-containing monomeric units are derived from monomers selected from the group consisting of: hydroxy alkyl acrylate monomers, hydroxy alkyl (meth)acrylate monomers, hydroxy alkyl acrylamide monomers, hydroxy alkyl (meth)acrylamide monomers, hydroxy glyceryl acrylate monomers, hydroxy glyceryl (meth)acrylate monomers, hydroxyethylether (meth)acrylate monomers, hydroxyethylether acrylamide monomers, and mixtures thereof.

To be clear, a carboxylic acid moiety (—C(O)OH) is not a pendant hydroxyl group for purposes of the present invention.

Pendant Hydroxyl Alkylether-Containing Monomeric Unit

Similar to the pendant hydroxyl-containing monomeric unit, the pendant hydroxyl alkylether-containing monomeric unit serves as a reactive group to participate in the cross-linking reaction. However, it is believed that the increased chain flexibility of the hydroxyl alkylether side chain would promote increased reactivity with the cross-linker thereby promoting a network structure with a higher cross-link density.

One example of a suitable hydroxyl alkylether-containing monomeric unit is derived from a vinylether monomer. In one example, the pendant hydroxyl alkylether-containing monomeric unit has the following Formula IV:

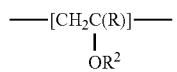

IV wherein R is independently selected from the group consisting of: H and $C_1$-$C_3$ alkyl, n is from 1-10, and $R^2$ is a linear or branched, hydroxyl-containing $C_1$-$C_{12}$ hydrocarbon.

Pendant Hydroxyl Alkylester-Containing Monomeric Unit

Similar to the pendant hydroxyl-containing monomeric unit, the pendant hydroxyl alkylester-containing monomeric unit serves as a reactive group to participate in the cross-linking reaction. However, it is believed that the increased chain flexibility of the hydroxyl alkylester side chain would promote increased reactivity with the cross-linker thereby promoting a network structure with a higher cross-link density.

In one example, the pendant hydroxyl alkylester-containing monomeric unit has the following Formula V:

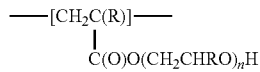

V wherein R is independently selected from the group consisting of: H and $C_1$-$C_3$ alkyl, n is from 1-10.

Pendant Hydroxyl Alkylamide-Containing Monomeric Unit

Similar to the pendant hydroxyl-containing monomeric unit, the pendant hydroxyl alkylamide-containing monomeric unit serves as a reactive group to participate in the cross-linking reaction. However, it is believed that the increased chain flexibility of the hydroxyl alkylamide side chain would promote increased reactivity with the cross-linker thereby promoting a network structure with a higher cross-link density.

In one example, the pendant hydroxyl alkylamide-containing monomeric unit has the following Formula VI:

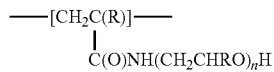

VI wherein R is independently selected from the group consisting of: H and $C_1$-$C_3$ alkyl, n is from 1-10.

Fibrous Elements

The fibrous elements of the present invention comprise a filament-forming polymer, such as a hydroxyl polymer and an acrylamide-based copolymer of the present invention. In one example, the fibrous elements may comprise two or more filament-forming polymers, such as two or more hydroxyl polymers. In another example, the fibrous elements may comprise two or more acrylamide-based copolymers of the present invention. In another example, the fibrous elements may comprise two or more acrylamide-based copolymers of the present invention at least one of which exhibits a weight average molecular weight of greater than 2,000,000 g/mol and/or is present in the fibrous elements and/or exhibits a polydispersity of greater than 1.32. In another example, the fibrous element may comprise two or more filament-forming polymers, such as two or more hydroxyl polymers, at least one of which is starch and/or a starch derivative and one of which is a non-starch and/or non-starch derivative, such as polyvinyl alcohol. In one example, the fibrous element comprises a filament. In another example, the fibrous element comprises a fiber.

In addition to the filament-forming polymers and acrylamide-based copolymers of the present invention, the fibrous elements of the present invention may further comprise one or more non-hydroxyl polymers.

In addition to the filament-forming polymers and acrylamide-based copolymers of the present invention, the fibrous elements of the present invention may further comprise a crosslinking agent. In one example, the crosslinking agent crosslinks one or more of the polymers and copolymers upon curing.

The non-hydroxyl polymers and acrylamide-based copolymers of the present invention that are substantially compatible with the filament-forming polymer, such as starch, are also useful herein as an extensional viscosity spinning aid. "Substantially compatible" means that the non-hydroxyl polymer and/or acrylamide-based copolymer of the present invention does not exist as a separate polymer phase from the filament-forming polymer, such as the hydroxyl polymer. The molecular weight of a suitable non-hydroxyl polymer and/or acrylamide-based copolymer of the present invention should be sufficiently high to effectuate entanglements thus increasing the melt strength of the aqueous polymer melt composition in which it is present, and preventing melt fracture during spinning of the aqueous polymer melt composition to produce fibrous elements.

In one example, the acrylamide-based copolymer of the present invention comprises a substantially linear chain structure, though an acrylamide-based copolymer having a linear chain having short branches (1-5 monomer units) may also be suitable for use herein. Typically the weight average molecular weight of the acrylamide-based copolymer ranges from about 2,000,000 g/mol to about 10,000,000 g/mol and/or from about 2,500,000 g/mol to about 8,000,000 g/mol and/or from about 3,000,000 g/mol to about 7,000,000 g/mol as determined by the Molecular Weight and Molecular Weight Distribution Test Method described herein. In the melt processing of the aqueous polymer melt composition of the present invention prior to forming the fibrous elements, the weight average molecular weight of the acrylamide-based copolymer may be degraded by shear to about 1,000,000 g/mol to 3,000,000 g/mol as determined by analysis of the fibrous structure with the Degradation of Fibrous Structure Test Method, described herein followed by the Molecular Weight and Molecular Weight Distribution Test Method described herein. Typically, the acrylamide-based copolymers are present in an amount of from about 0.001% to about 10% and/or from about 0.01% to about 10% and/or from about 0.05% to about 5% and/or from about 0.075% to about 2.5% and/or from about 0.1% to about 1%, by weight of the aqueous polymer melt composition, fibrous element and/or fibrous structure.

Since the acrylamide-based copolymers of the present invention are shear sensitive it is important that $M_w$ is the chain length after the acrylamide-based copolymer has been degraded through the melt processing and is in the final fibrous element composition. The average chain length of the acrylamide-based copolymer after melt processing is determined by a combination of the Degradation of Fibrous Structure Test Method followed by the Molecular Weight and Molecular Weight Distribution Test Method both methods described herein.

Filament-Forming Polymers

The aqueous polymer melt compositions of the present invention and/or fibrous elements, such as filaments and/or fibers, of the present invention that associate to form the fibrous structures of the present invention contain at least one filament-forming polymer, such as a hydroxyl polymer, and at least one acrylamide-based copolymer, and may contain other types of polymers such as non-hydroxyl polymers, for example polyacrylamide, a homopolymer, that exhibit weight average molecular weights of greater than 500,000 g/mol, and mixtures thereof as determined by the Molecular Weight and Molecular Weight Distribution Test Method described herein.

Non-limiting examples of hydroxyl polymers in accordance with the present invention include polyols, such as polyvinyl alcohol, polyvinyl alcohol derivatives, polyvinyl alcohol copolymers, starch, starch derivatives, starch copolymers, chitosan, chitosan derivatives, chitosan copolymers, cellulose, cellulose derivatives such as cellulose ether and ester derivatives, cellulose copolymers, hemicellulose, hemicellulose derivatives, hemicellulose copolymers, gums, arabinans, galactans, proteins and various other polysaccharides and mixtures thereof.

In one example, a hydroxyl polymer of the present invention comprises a polysaccharide.

In another example, a hydroxyl polymer of the present invention comprises a non-thermoplastic polymer.

The hydroxyl polymer may have a weight average molecular weight of from about 10,000 g/mol to about 40,000,000 g/mol and/or greater than 100,000 g/mol and/or greater than 1,000,000 g/mol and/or greater than 3,000,000 g/mol and/or greater than 3,000,000 g/mol to about 40,000,000 g/mol as determined by the Molecular Weight and Molecular Weight Distribution Test Method described herein. Higher and lower molecular weight hydroxyl polymers may be used in combination with hydroxyl polymers having a certain desired weight average molecular weight.

Well known modifications of hydroxyl polymers, such as natural starches, include chemical modifications and/or enzymatic modifications. For example, natural starch can be acid-thinned, hydroxy-ethylated, hydroxy-propylated, and/or oxidized. In addition, the hydroxyl polymer may comprise dent corn starch.

Polyvinyl alcohols herein can be grafted with other monomers to modify its properties. A wide range of monomers has been successfully grafted to polyvinyl alcohol. Non-limiting examples of such monomers include vinyl acetate, styrene, acrylamide, acrylic acid, 2-hydroxyethyl methacrylate, acrylonitrile, 1,3-butadiene, methyl methacrylate, methacrylic acid, vinylidene chloride, vinyl chloride, vinyl amine and a variety of acrylate esters. Polyvinyl alcohols comprise the various hydrolysis products formed from polyvinyl acetate.

In one example the level of hydrolysis of the polyvinyl alcohols is greater than 70% and/or greater than 88% and/or greater than 95% and/or about 99%.

"Polysaccharides" as used herein means natural polysaccharides and polysaccharide derivatives and/or modified polysaccharides. Suitable polysaccharides include, but are not limited to, starches, starch derivatives, starch copolymers, chitosan, chitosan derivatives, chitosan copolymers, cellulose, cellulose derivatives, cellulose copolymers, hemicellulose, hemicellulose derivatives, hemicelluloses copolymers, gums, arabinans, galactans, and mixtures thereof. The polysaccharide may exhibit a weight average molecular weight of from about 10,000 to about 40,000,000 g/mol and/or greater than about 100,000 and/or greater than about 1,000,000 and/or greater than about 3,000,000 and/or greater than about 3,000,000 to about 40,000,000 as determined by the Weight Average Molecular Weight Test Method described herein.

The polysaccharides of the present invention may comprise non-cellulose and/or non-cellulose derivative and/or non-cellulose copolymer hydroxyl polymers. Non-limiting example of such non-cellulose polysaccharides may be selected from the group consisting of: starches, starch derivatives, starch copolymers, chitosan, chitosan derivatives, chitosan copolymers, hemicellulose, hemicellulose derivatives, hemicelluloses copolymers, and mixtures thereof.

In one example, the hydroxyl polymer comprises starch, a starch derivative and/or a starch copolymer. In another example, the hydroxyl polymer comprises starch and/or a starch derivative. In yet another example, the hydroxyl polymer comprises starch. In one example, the hydroxyl polymer comprises ethoxylated starch. In another example, the hydroxyl polymer comprises acid-thinned starch.

As is known, a natural starch can be modified chemically or enzymatically, as well known in the art. For example, the natural starch can be acid-thinned, hydroxy-ethylated, hydroxy-propylated, ethersuccinylated or oxidized. In one example, the starch comprises a high amylopectin natural starch (a starch that contains greater than 75% and/or greater than 90% and/or greater than 98% and/or about 99% amylopectin). Such high amylopectin natural starches may be derived from agricultural sources, which offer the advantages of being abundant in supply, easily replenishable and relatively inexpensive. Chemical modifications of starch typically include acid or alkaline-catalyzed hydrolysis and chain scission (oxidative and/or enzymatic) to reduce molecular weight and molecular weight distribution. Suitable compounds for chemical modification of starch include organic acids such as citric acid, acetic acid, glycolic acid, and adipic acid; inorganic acids such as hydrochloric acid, sulfuric acid, nitric acid, phosphoric acid, boric acid, and partial salts of polybasic acids, e.g., $KH_2PO_4$, $NaHSO_4$; group Ia or IIa metal hydroxides such as sodium hydroxide, and potassium hydroxide; ammonia; oxidizing agents such as hydrogen peroxide, benzoyl peroxide, ammonium persulfate, potassium permanganate, hypochloric salts, and the like; and mixtures thereof.

"Modified starch" is a starch that has been modified chemically or enzymatically. The modified starch is contrasted with a native starch, which is a starch that has not been modified, chemically or otherwise, in any way.

Chemical modifications may also include derivatization of starch by reaction of its hydroxyl groups with alkylene oxides, and other ether-, ester-, urethane-, carbamate-, or isocyanate-forming substances. Hydroxyalkyl, ethersuccinylated, acetyl, or carbamate starches or mixtures thereof can be used as chemically modified starches. The degree of substitution of the chemically modified starch is from 0.001 to 3.0, and more specifically from 0.003 to 0.2. Biological modifications of starch may include bacterial digestion of the carbohydrate bonds, or enzymatic hydrolysis using enzymes such as amylase, amylopectase, and the like.

Generally, all kinds of natural starches can be used in the present invention. Suitable naturally occurring starches can include, but are not limited to: corn starch, potato starch, sweet potato starch, wheat starch, sago palm starch, tapioca starch, rice starch, soybean starch, arrow root starch, amioca starch, bracken starch, lotus starch, waxy maize starch, and high amylose corn starch. Naturally occurring starches, particularly corn starch and wheat starch, can be particularly beneficial due to their low cost and availability.

In order to generate the required rheological properties for high-speed spinning processes, the molecular weight of the natural, unmodified starch should be reduced. The optimum molecular weight is dependent on the type of starch used. For example, a starch with a low level of amylose component, such as a waxy maize starch, disperses rather easily in an aqueous solution with the application of heat and does not retrograde or recrystallize significantly. With these properties, a waxy maize starch can be used at a weight average molecular weight, for example in the range of 500,000 g/mol to 40,000,000 g/mol as determined by the Molecular Weight and Molecular Weight Distribution Test Method described herein. Modified starches such as hydroxy-ethylated Dent corn starch, which contains about 25% amylose, or oxidized Dent corn starch tend to retrograde more than waxy maize starch but less than acid thinned starch. This retrogradation, or recrystallization, acts as a physical cross-linking to effectively raise the weight average molecular weight of the starch in aqueous solution. Therefore, an appropriate weight average molecular weight for a typical commercially available hydroxyethylated Dent corn starch with 2 wt. % hydroxyethylation or oxidized Dent corn starch is from about 200,000 g/mol to about 10,000,000 g/mol as determined by the Molecular Weight and Molecular Weight Distribution Test Method described herein. For ethoxylated starches with higher degrees of ethoxylation, for example a hydroxyethylated Dent corn starch with 5 wt % hydroxyethylation, weight average molecular weights of up to 40,000,000 g/mol as determined by the Molecular Weight and Molecular Weight Distribution Test Method described herein may be suitable for the present invention. For acid thinned Dent corn starch, which tends to retrograde more than oxidized Dent corn starch, the appropriate weight average molecular weight is from about 100,000 g/mol to about 15,000,000 g/mol as determined by the Molecular Weight and Molecular Weight Distribution Test Method described herein.

The weight average molecular weight of starch may also be reduced to a desirable range for the present invention by physical/mechanical degradation (e.g., via the thermomechanical energy input of the processing equipment).

The natural starch can be hydrolyzed in the presence of an acid catalyst to reduce the molecular weight and molecular weight distribution of the composition. The acid catalyst can be selected from the group consisting of hydrochloric acid, sulfuric acid, phosphoric acid, citric acid, ammonium chloride and any combination thereof. Also, a chain scission agent may be incorporated into a spinnable starch composition such that the chain scission reaction takes place substantially concurrently with the blending of the starch with other components. Non-limiting examples of oxidative chain scission agents suitable for use herein include ammonium persulfate, hydrogen peroxide, hypochlorite salts, potassium permanganate, and mixtures thereof. Typically, the chain scission agent is added in an amount effective to reduce the weight average molecular weight of the starch to the desirable range. It is found that compositions having modified starches in the suitable weight average molecular weight ranges have suitable shear viscosities, and thus improve processability of the composition. The improved processability is evident in less interruptions of the process (e.g., reduced breakage, shots, defects, hang-ups) and better surface appearance and strength properties of the final product, such as fibers of the present invention.

In one example, the fibrous element of the present invention is void of thermoplastic, water-insoluble polymers.

Non-hydroxyl Polymers

Non-limiting examples of suitable non-hydroxyl polymers suitable for use with the copolymers of the present invention include non-hydroxyl polymers that exhibit a weight average molecular weight of greater than 500,000 g/mol and/or greater than 750,000 g/mol and/or greater than 1,000,000 g/mol and/or greater than 1,250,000 g/mol and/or at greater than 1,400,000 g/mol and/or at least 1,450,000 g/mol and/or at least 1,500,000 g/mol and/or less than 10,000,000 g/mol and/or less than 5,000,000 g/mol and/or less than 2,500,00 g/mol and/or less than 2,000,000 g/mol and/or less than 1,750,000 g/mol as determined by the Molecular Weight and Molecular Weight Distribution Test Method described herein.

In one example, the non-hydroxyl polymer exhibits a polydispersity of greater than 1.10 and/or at least 1.20 and/or at least 1.30 and/or at least 1.32 and/or at least 1.33 and/or at least 1.35 and/or at least 1.40 and/or at least 1.45.

In another example, the non-hydroxyl polymer exhibits a concentration greater than its entanglement concentration (Ce) and/or a concentration greater than 1.2 times its entanglement concentration (Ce) and/or a concentration greater than 1.5 times its entanglement concentration (Ce) and/or a concentration greater than twice its entanglement concentration (Ce) and/or a concentration greater than 3 times its entanglement concentration (Ce).

In yet another example, the non-hydroxyl polymer comprises a linear polymer. In another example, the non-hydroxyl polymer comprises a long chain branched polymer. In still another example, the non-hydroxyl polymer is compatible with the hydroxyl polymer at a concentration greater than the non-hydroxyl polymer's entanglement concentration $C_e$.

Non-limiting examples of suitable non-hydroxyl polymers are selected from the group consisting of: polyacrylamide and its derivatives; polyacrylic acid, polymethacrylic acid and their esters; polyethyleneimine; copolymers made from mixtures of the aforementioned polymers; and mixtures thereof. In one example, the non-hydroxyl polymer comprises polyacrylamide. In one example, the fibrous elements comprises two or more non-hydroxyl polymers, such as two or more polyacrylamides, such at two or more different weight average molecular weight polyacrylamides.

Non-hydroxyl polymers which are substantially compatible with starch are also useful herein as an extensional viscosity spinning aid. "Substantially compatible" means that the non-hydroxyl polymer does not exist as a separate polymer phase from the filament-forming polymer, such as the hydroxyl polymer. The molecular weight of a suitable polymer should be sufficiently high to effectuate entanglements thus increasing the melt strength of the aqueous polymer melt composition in which it is present, and preventing melt fracture during spinning of the aqueous polymer melt composition to produce fibrous elements.

In one example, the non-hydroxyl polymer is at a sufficient concentration and molecular weight such that the polymer chains of the non-hydroxyl polymer are overlapped and form entanglement couplings. For example, the non-hydroxyl polymer concentration is above the entanglement concentration ($c_e$), where $c_e$ is either measured or calculated. For neutral polymers, such as polyacrylamide, in a good solvent, such as water (or other solvent where $Rg \sim N^{0.6}$ where Rg is the polymer's radius of gyration and N is the polymer molecular weight) or polyelectrolytes in the high salt limit, the following scaling relationships set forth below in Equation (Eq.) (1) apply.

$$\eta_0 \sim c^{1.25} \ c<c_e \ \eta_0 \sim c^{4.6} \ c<c_e \quad (1)$$

Thus, $c_e$ is experimentally measured by finding the inflection point in the dependence of zero shear viscosity ($\eta_0$) on concentration. The entanglement concentration is also calculated from Eq. (2) below, $$c_e = \frac{M_c}{M_w} \quad (2)$$

where $M_c$ is the critical entanglement molecular weight of the polymer species, and $M_w$ is the weight average molecular weight as determined by the Molecular Weight and Molecular Weight Distribution Test Method. For example, a polyacrylamide (PAAm) with an $M_w$ of 10,000,000 g/mol must be present at ~0.1% ($M_c$ of PAAm is 9100 g/mol) for sufficient entanglement between chains. For $c<c_e$, lack of entanglement couplings result in inadequate melt strength, while for $c>>c_e$ the filament will resist attenuation due to the high degree of strain hardening and melt elasticity. From Eq. (2) a higher or lower molecular weight polymer may be utilized if its concentration is adjusted accordingly such that the PAAm level is above $c_e$.

In one example, the non-hydroxyl polymer comprises a substantially linear chain structure, though a non-hydroxyl polymer having a linear chain having short branches (1-5 monomer units) may also be suitable for use herein. Typically the weight average molecular weight of the non-hydroxyl polymer ranges from about 500,000 g/mol to 10,000,000 g/mol and/or from about 700,000 g/mol to about 5,000,000 g/mol and/or from about 1,000,000 g/mol to about 5,000,000 g/mol as determined by the Molecular Weight and Molecular Weight Distribution Test Method described herein. In the melt processing of the aqueous polymer melt composition of the present invention prior to forming the fibrous elements, the weight average molecular weight of the non-hydroxyl polymer may be degraded by shear to about 1,000,000 g/mol to 3,000,000 g/mol as determined by analysis of the fibrous structure with the Degradation of Fibrous Structure Test Method, described herein followed by the Molecular Weight and Molecular Weight Distribution Test Method described herein. Typically, the non-hydroxyl polymers are present in an amount of from about 0.01% to about 10% and/or from about 0.05% to about 5% and/or from about 0.075% to about 2.5% and/or from about 0.1% to about 1%, by weight of the aqueous polymer melt composition, polymeric structure, fibrous element and/or fibrous structure.

Since non-hydroxyl polymers are shear sensitive it is important that $M_w$ from Eq. (2) is the chain length after the non-hydroxyl polymer has been degraded through the melt processing and is in the final fibrous element composition. The average chain length of the non-hydroxyl polymer after melt processing is determined by a combination of the Degradation of Fibrous Structure Test Method followed by the Molecular Weight and Molecular Weight Distribution Test Method both methods described herein.

Non-limiting examples of suitable non-hydroxyl polymers include polyacrylamide and derivatives such as carboxyl modified polyacrylamide polymers and copolymers including polyacrylic, poly(hydroxyethyl acrylic), polymethacrylic acid and their partial esters; vinyl polymers including polyvinylalcohol, polyvinylpyrrolidone, and the like; polyamides; polyalkylene oxides such as polyethylene oxide and mixtures thereof. Copolymers or graft copolymers made from mixtures of monomers selected from the aforementioned polymers are also suitable herein. Non-limiting examples of commercially available polyacrylamides include nonionic polyacrylamides such as N300 from Kemira or Hyperfloc® NF221, NF301, and NF241 from Hychem, Inc.

Surfactants

The aqueous polymer melt compositions of the present invention and/or fibrous elements of the present invention and fibrous structures formed therefrom may comprise one or more surfactants. In one example, the surfactant is a fast wetting surfactant. In another example, the surfactant comprises a non-fast wetting surfactant, such as Aerosol® OT from Cytec.

Non-limiting examples of suitable fast wetting surfactants include surfactants that exhibit a twin-tailed general structure, for example a surfactant that exhibits a structure VIIA or VIIB as follows.

Structure VIIA

Structure VIIB wherein R is independently selected from substituted or unsubstituted, linear or branched aliphatic groups and mixtures thereof. In one example, R is independently selected from substituted or unsubstituted, linear or branched $C_4$-$C_7$ aliphatic chains and mixtures thereof. In another example, R is independently selected from substituted or unsubstituted, linear or branched $C_4$-$C_7$ alkyls and mixtures thereof and M is a suitable cation, such as an alkali metal cation and/or an ammonium cation. In another example, R is independently selected from substituted or unsubstituted, linear or branched $C_5$-$C_6$ alkyls and mixtures thereof. In still another example, R is independently selected from substituted or unsubstituted, linear or branched $C_6$ alkyls and mixtures thereof. In even another example, R is an unsubstituted, branched $C_6$ alkyl having the following structure VIII.

Structure VIII

In another example, R is independently selected from substituted or unsubstituted, linear or branched C$_5$ alkyls and mixtures thereof. In yet another example, R is independently selected from unsubstituted, linear C$_5$ alkyls and mixtures thereof. The C$_5$ alkyl may comprise a mixture of unsubstituted linear C$_5$ alkyls, for example C$_5$ n-pentyl, and/or 1-methyl branched C$_5$ alkyls as shown in the following structure IX.

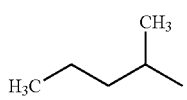

Structure IX

In even another example, R comprises a mixture of C$_4$-C$_7$ alkyls and/or a mixture of C$_5$-C$_6$ alkyls.

The fast wetting surfactants may be present in the polymer melt compositions, fibrous elements, and/or fibrous structures of the present invention, alone or in combination with other non-fast wetting surfactants.

In one example, the fast wetting surfactants of the present invention may be used individually or in mixtures with each other or in a mixture with one or more non-fast wetting surfactants, for example a C$_8$ sulfosuccinate surfactant where R is the following structure X

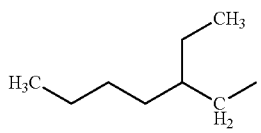

Structure X

In one example a fast wetting surfactant comprises a sulfosuccinate surfactant having the following structure XI.

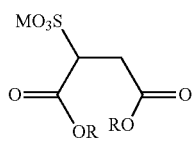

Structure XI wherein R is independently selected from substituted or unsubstituted, linear or branched aliphatic groups and mixtures thereof and M is a suitable cation, such as an alkali metal cation and/or an ammonium cation. In one example, R is independently selected from substituted or unsubstituted, linear or branched C$_4$-C$_7$ aliphatic chains and mixtures thereof. In another example, R is independently selected from substituted or unsubstituted, linear or branched C$_4$-C$_7$ alkyls and mixtures thereof. In another example, R is independently selected from substituted or unsubstituted, linear or branched C$_5$-C$_6$ alkyls and mixtures thereof. In still another example, R is independently selected from substituted or unsubstituted, linear or branched C$_6$ alkyls and mixtures thereof. In even another example, R is an unsubstituted, branched C$_6$ alkyl having the following structure XII.

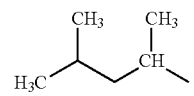

Structure XII

Non-limiting examples of fast wetting surfactants according to the present invention include sulfosuccinate surfactants, for example a sulfosuccinate surfactant that has structure VIII as its R groups (Aerosol® MA-80), a sulfosuccinate surfactant that has C$_4$ isobutyl as its R groups (Aerosol® IB), and a sulfosuccinate surfactant that has a mixture of C$_5$ n-pentyl and structure IX as its R groups (Aerosol® AY), all commercially available from Cytec.

Additional non-limiting examples of fast wetting surfactants according to the present invention include alcohol sulfates derived from branched alcohols such as Isalchem and Lial alcohols (from Sasol) ie. Dacpon 27 23 AS and Guerbet alcohols from Lucky Chemical. Still another example of a fast wetting surfactant includes paraffin sulfonates such as Hostapur SAS30 from Clariant.

Typically, the fast wetting surfactants are present in an amount of from about 0.01% to about 5% and/or from about 0.5% to about 2.5% and/or from about 1% to about 2% and/or from about 1% to about 1.5%, by weight of the aqueous polymer melt composition, polymeric structure, fibrous element and/or fibrous structure.

A fast wetting surfactant may be present both in the interior and exterior of the fibrous elements produced from the aqueous polymer melt composition, which is distinguished from a surface only treatment of the formed fibrous elements. Any fast wetting surfactant that is present on the exterior of a fibrous element may be determined by extracting the fibrous element with a solvent that dissolves the surfactant, but does not swell the fibrous element and then analyzing for the surfactant by LC-mass spec. The surfactant that is present in the interior of the fibrous element may be determined by extracting the fibrous element with a solvent that dissolves the surfactant and also swells the fibrous elements, such as water/alcohol or water/acetone mixtures followed by analysis for surfactant by a technique such as LC mass spec. Alternatively, the fibrous element may be treated with an enzyme such as amylase that degrades the fibrous element-forming polymer, for example polysaccharide, but not the fast wetting surfactant and the resulting solution may be analyzed for the surfactant by LC-mass spec.

Solid Additives

The fibrous structures and/or sanitary tissue products of the present invention may further comprise one or more solid additives. "Solid additive" as used herein means an additive that is capable of being applied to a surface of a fibrous structure in a solid form. In other words, the solid additive of the present invention can be delivered directly to a surface of a nonwoven substrate without a liquid phase being present, i.e. without melting the solid additive and without suspending the solid additive in a liquid vehicle or carrier. As such, the solid additive of the present invention does not require a liquid state or a liquid vehicle or carrier in order to be delivered to a surface of a nonwoven substrate. The solid additive of the present invention may be delivered via a gas or combinations of gases. In one example, in simplistic terms, a solid additive is an additive that when placed within a container, does not take the shape of the container.

The solid additives of the present invention may have different geometries and/or cross-sectional areas that include round, elliptical, star-shaped, rectangular, trilobal and other various eccentricities.

In one example, the solid additive may exhibit a particle size of less than 6 mm and/or less than 5.5 mm and/or less than 5 mm and/or less than 4.5 mm and/or less than 4 mm and/or less than 2 mm in its maximum dimension.

"Particle" as used herein means an object having an aspect ratio of less than about 25/1 and/or less than about 15/1 and/or less than about 10/1 and/or less than 5/1 to about 1/1. A particle is not a fiber as defined herein.

The solid additives may be present in the fibrous structures of the present invention at a level of greater than about 1 and/or greater than about 2 and/or greater than about 4 and/or to about 20 and/or to about 15 and/or to about 10 $g/m^2$. In one example, a fibrous structure of the present invention comprises from about 2 to about 10 and/or from about 5 to about 10 $g/m^2$ of solid additive.

In one example, the solid additives are present in the fibrous structures of the present invention at a level of greater than 5% and/or greater than 10% and/or greater than 20% to about 50% and/or to about 40% and/or to about 30%.

Non-limiting examples of solid additives of the present invention include fibers, for example pulp fibers. Non-limiting examples of pulp fibers include hardwood pulp fibers, softwood pulp fibers, and mixtures thereof. In one example, the solid additives comprise eucalyptus pulp fibers. In another example, the solid additives include chemically treated pulp fibers.

Scrim Material

The fibrous structure and/or sanitary tissue product may further comprise a scrim material. The scrim material may comprise any suitable material capable of bonding to the nonwoven substrate of the present invention. In one example, the scrim material comprises a material that can be thermally bonded to the nonwoven substrate of the present invention. Non-limiting examples of suitable scrim materials include filaments of the present invention. In one example, the scrim material comprises filaments that comprise hydroxyl polymers. In another example, the scrim material comprises starch filaments. In yet another example, the scrim material comprises filaments comprising a thermoplastic polymer. In still another example, the scrim material comprises a fibrous structure according to the present invention wherein the fibrous structure comprises filaments comprising hydroxyl polymers, such as starch filaments, and/or thermoplastic polymers. In another example, the scrim material may comprise a film. In another example, the scrim material may comprise a nonwoven substrate according to the present invention. In even another example, the scrim material may comprise a latex.

In one example, solid additives are positioned between the scrim material and the nonwoven substrate, for example a surface of the nonwoven substrate. The scrim material may be connected to a surface of the nonwoven substrate, for example at one or more bond sites.

In one example, the scrim material may be the same composition as the nonwoven substrate.

The scrim material may be present in the fibrous structures of the present invention at a basis weight of greater than 0.1 and/or greater than 0.3 and/or greater than 0.5 and/or greater than 1 and/or greater than 2 $g/m^2$ and/or less than 10 and/or less than 7 and/or less than 5 and/or less than 4 $g/m^2$ as determined by the Basis Weight Test Method described herein.

Methods of the Present Invention

The methods of the present invention relate to producing polymeric structures, such as fibrous elements, from aqueous polymer melt compositions comprising a filament-forming polymer, such as a hydroxyl polymer, and an acrylamide-based copolymer, as described herein.

Methods for Making Fibrous Structure

Figure 2:
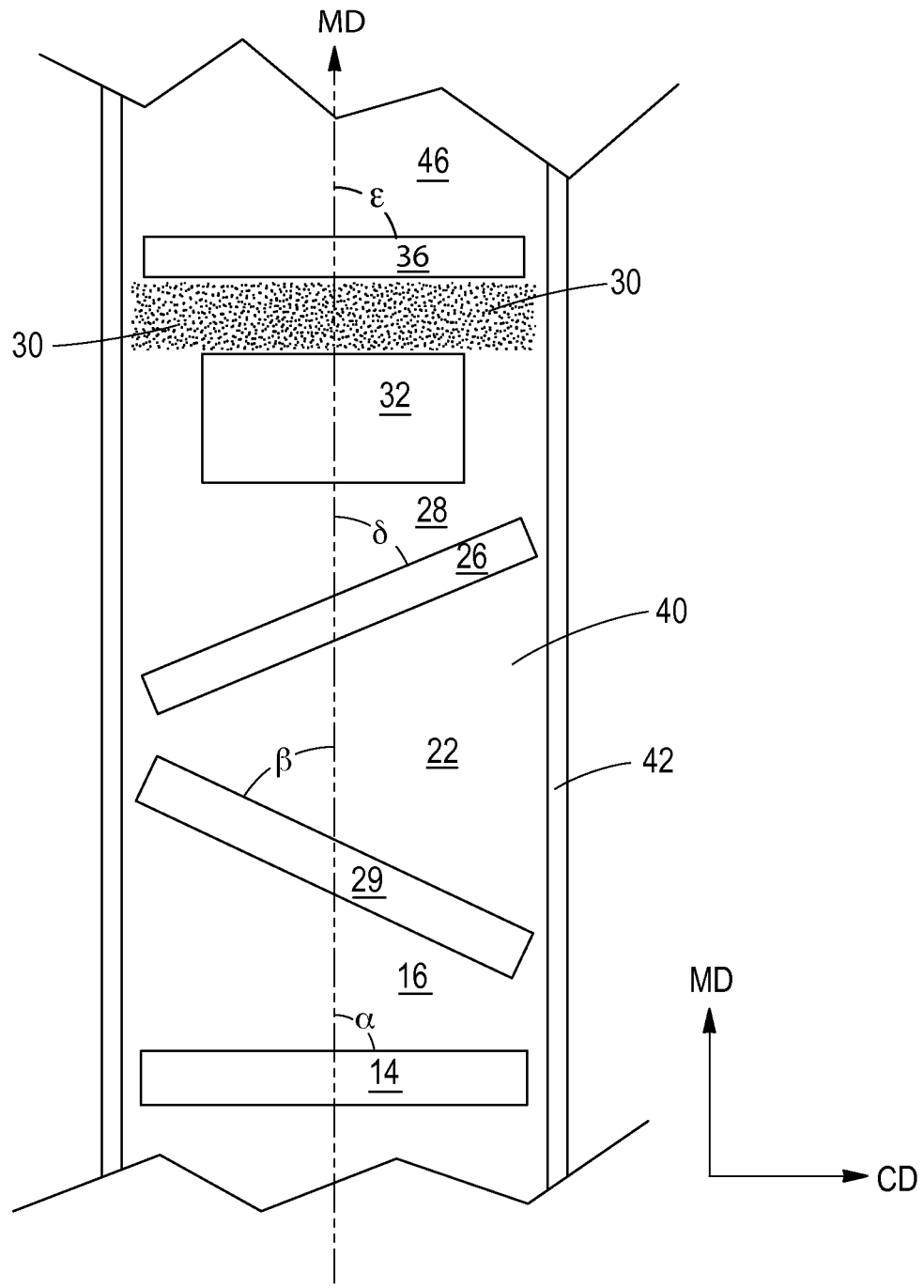
FIG. 2 is a schematic representation of one example of a portion of fibrous structure making process according to the present invention.

FIGS. 1 and 2 illustrate one example of a method for making a fibrous structure of the present invention. As shown in FIGS. 1 and 2, the method 10 comprises the steps of:

a. providing first filaments 12 from a first source 14 of filaments, which form a first layer 16 of filaments;

b. providing second filaments 18 from a second source 20 of filaments, which form a second layer 22 of filaments;

c. providing third filaments 24 from a third source 26 of filaments, which form a third layer 28 of filaments;

d. providing solid additives 30 from a source 32 of solid additives;

e. providing fourth filaments 34 from a fourth source 36 of filaments, which form a fourth layer 38 of filaments; and f. collecting the first, second, third, and fourth filaments 12, 18, 24, 34 and the solid additives 30 to form a fibrous structure 40, wherein the first source 14 of filaments is oriented at a first angle $\alpha$ to the machine direction of the fibrous structure 40, the second source 20 of filaments is oriented at a second angle $\beta$ to the machine direction different from the first angle $\alpha$, the third source 26 is oriented at a third angle $\delta$ to the machine direction different from the first angle $\alpha$ and the second angle 13, and wherein the fourth source 36 is oriented at a fourth angle $\epsilon$ to the machine direction different from the second angle $\beta$ and third angle $\delta$.

The first, second, and third layers 16, 22, 28 of filaments are collected on a collection device 42, which may be a belt or fabric. The collection device 42 may be a patterned belt that imparts a pattern, such as a non-random, repeating pattern to the fibrous structure 40 during the fibrous structure making process. The first, second, and third layers 16, 22, 28 of filaments are collected (for example one on top of the other) on the collection device 42 to form a multi-layer nonwoven substrate 44 upon which the solid additives 30 are deposited. The fourth layer 38 of filaments may then be deposited onto the solid additives 30 to form a scrim 46.

The first angle $\alpha$ and the fourth angle $\epsilon$ may be the same angle, for example 90° to the machine direction.

The second angle $\beta$ and the third angle $\delta$ may be the same angle, just positive and negative of one another. For example the second angle $\beta$ may be −40° to the machine direction and the third angle $\delta$ may be +40° to the machine direction.

In one example, at least one of the first, second, and third angles $\alpha$, $\beta$, $\delta$ is less than 90° to the machine direction. In another example, the first angle $\alpha$ and/or fourth angle $\epsilon$ is about 90° to the machine direction. In still another example, the second angle $\beta$ and/or third angle $\delta$ is from about ±10° to about ±80° and/or from about ±30° to about ±60° to the machine direction and/or about ±40° to the machine direction.

In one example, the first, second, and third layers 16, 22, 28 of filaments may be formed into a nonwoven substrate 44 prior to being utilized in the process for making a fibrous structure described above. In this case, the nonwoven substrate 44 would likely be in a parent roll that could be unwound into the fibrous structure making process and the solid additives 30 could be deposited directly onto a surface of the nonwoven substrate 44.

In one example, the step of providing a plurality of solid additives 30 onto the nonwoven substrate 44 may comprise airlaying the solid additives 30 using an airlaying former. A non-limiting example of a suitable airlaying former is available from Dan-Web of Aarhus, Denmark.

In one example, the step of providing fourth filaments 34 such that the filaments contact the solid additives 30 comprises the step of depositing the fourth filaments 34 such that at least a portion (in one example all or substantially all) of the solid additives 30 are contacted by the fourth filaments 34 thus positioning the solid additives 30 between the fourth layer 38 of filaments and the nonwoven substrate 44. Once the fourth layer 38 of filaments is in place, the fibrous structure 40 may be subjected to a bonding step that bonds the fourth layer 38 of filaments (in this case, the scrim 46) to the nonwoven substrate 44. This step of bonding may comprise a thermal bonding operation. The thermal bonding operation may comprise passing the fibrous structure 40 through a nip formed by thermal bonding rolls 48, 50. At least one of the thermal bonding rolls 48, 50 may comprise a pattern that is translated into the bond sites 52 formed in the fibrous structure 40.

In addition to being subjected to a bonding operation, the fibrous structure may also be subjected to other post-processing operations such as embossing, tuft-generating, gear rolling, which includes passing the fibrous structure through a nip formed between two engaged gear rolls, moisture-imparting operations, free-fiber end generating, and surface treating to form a finished fibrous structure. In one example, the fibrous structure is subjected to gear rolling by passing the fibrous structure through a nip formed by at least a pair of gear rolls. In one example, the fibrous structure is subjected to gear rolling such that free-fiber ends are created in the fibrous structure. The gear rolling may occur before or after two or more fibrous structures are combined to form a multi-ply sanitary tissue product. If it occurs after, then the multi-ply sanitary tissue product is passed through the nip formed by at least a pair of gear rolls.

The method for making a fibrous structure of the present invention may be close coupled (where the fibrous structure is convolutedly wound into a roll prior to proceeding to a converting operation) or directly coupled (where the fibrous structure is not convolutedly wound into a roll prior to proceeding to a converting operation) with a converting operation to emboss, print, deform, surface treat, or other post-forming operation known to those in the art. For purposes of the present invention, direct coupling means that the fibrous structure can proceed directly into a converting operation rather than, for example, being convolutedly wound into a roll and then unwound to proceed through a converting operation.

In one example, one or more plies of the fibrous structure according to the present invention may be combined with another ply of fibrous structure, which may also be a fibrous structure according to the present invention, to form a multi-ply sanitary tissue product that exhibits a Tensile Ratio of 3 or less and/or 2.5 or less and/or 2.2 or less and/or 2 or less and/or less than 1.7 and/or less than 1.5 and/or less than 1.3 and/or less than 1.1 and/or greater than 0.7 and/or greater than 0.9 as measured according to the Elongation/Tensile Strength/TEA/Tangent Modulus Test Method described herein. In one example, the multi-ply sanitary tissue product may be formed by combining two or more plies of fibrous structure according to the present invention. In another example, two or more plies of fibrous structure according to the present invention may be combined to form a multi-ply sanitary tissue product such that the solid additives present in the fibrous structure plies are adjacent to each of the outer surfaces of the multi-ply sanitary tissue product.

The process of the present invention may include preparing individual rolls of fibrous structure and/or sanitary tissue product comprising such fibrous structure(s) that are suitable for consumer use.

Even though the above non-limiting example of a process according to the present invention describes the use of four sources of filaments and four layers of filaments, the process may utilize a single source of filaments and/or multiple (greater than 4) sources of filaments and the fibrous structure may be a single layer or multiple layers depending on the number of sources of filaments.

Figure 3:
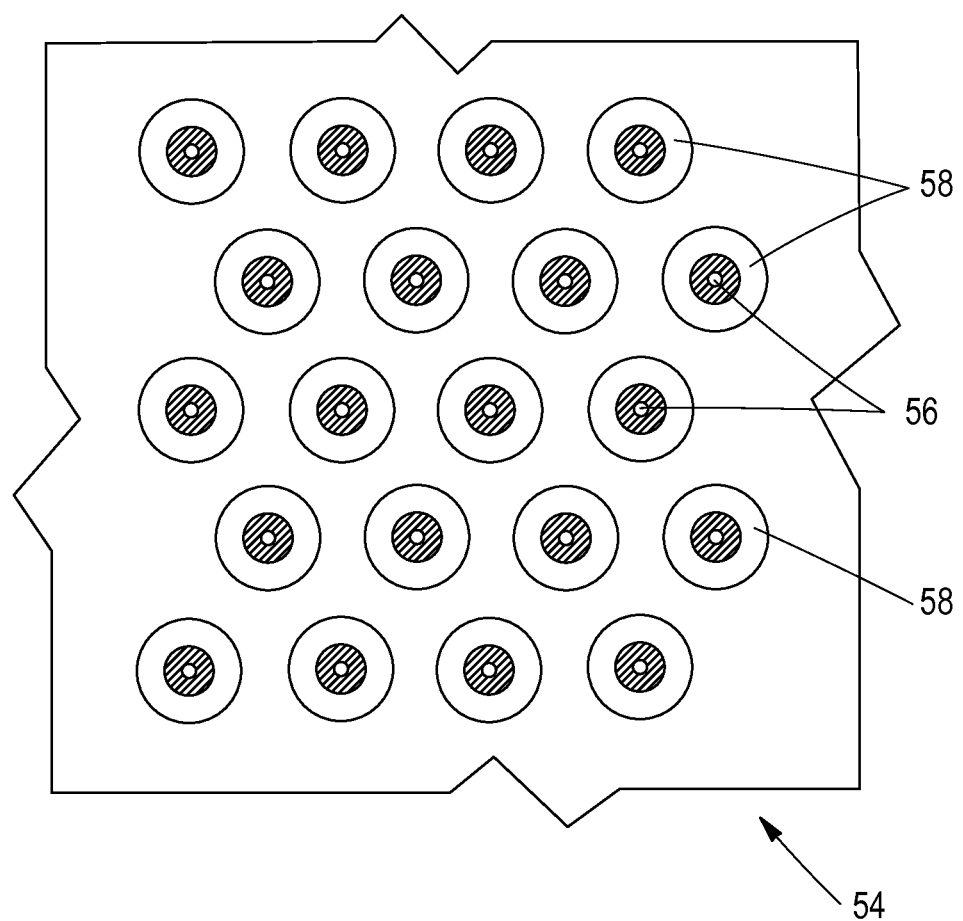
FIG. 3 is a schematic representation of an example of a meltblow die in accordance with the present invention.

In one example, the sources of filaments comprise meltblow dies that produce filaments from a polymer melt composition according to the present invention. In one example, as shown in FIG. 3 the meltblow die 54 may comprise at least one filament-forming hole 56, and/or 2 or more and/or 3 or more rows of filament-forming holes 56 from which filaments are spun. At least one row of the filament-forming holes 56 contains 2 or more and/or 3 or more and/or 10 or more filament-forming holes 56. In addition to the filament-forming holes 56, the meltblow die 54 comprises fluid-releasing holes 58, such as gas-releasing holes, in one example air-releasing holes, that provide attenuation to the filaments formed from the filament-forming holes 56. One or more fluid-releasing holes 58 may be associated with a filament-forming hole 56 such that the fluid exiting the fluid-releasing hole 58 is parallel or substantially parallel (rather than angled like a knife-edge die) to an exterior surface of a filament exiting the filament-forming hole 56. In one example, the fluid exiting the fluid-releasing hole 58 contacts the exterior surface of a filament formed from a filament-forming hole 56 at an angle of less than 30° and/or less than 20° and/or less than 10° and/or less than 5° and/or about 0°. One or more fluid releasing holes 58 may be arranged around a filament-forming hole 56. In one example, one or more fluid-releasing holes 58 are associated with a single filament-forming hole 56 such that the fluid exiting the one or more fluid releasing holes 58 contacts the exterior surface of a single filament formed from the single filament-forming hole 56. In one example, the fluid-releasing hole 58 permits a fluid, such as a gas, for example air, to contact the exterior surface of a filament formed from a filament-forming hole 56 rather than contacting an inner surface of a filament, such as what happens when a hollow filament is formed.

Aqueous Polymer Melt Composition

The aqueous polymer melt composition of the present invention comprises a melt processed filament-forming polymer, such as a melt processed hydroxyl polymer, and a fast wetting surfactant according to the present invention.

The aqueous polymer melt compositions may already be formed or a melt processing step may need to be performed to convert a raw material filament-forming polymer, such as a hydroxyl polymer, into a melt processed filament-forming polymer, such as a melt processed hydroxyl polymer, thus producing the aqueous polymer melt composition. Any suitable melt processing step known in the art may be used to convert the raw material filament-forming polymer into the melt processed filament-forming polymer. "Melt processing" as used herein means any operation and/or process by which a polymer is softened to such a degree that it can be brought into a flowable state.

The aqueous polymer melt compositions of the present invention may have a shear viscosity, as measured according to the Shear Viscosity of a Polymer Melt Composition Measurement Test Method described herein, of from about 0.5 Pascal·Seconds to about 25 Pascal·Seconds and/or from about 2 Pascal·Seconds to about 20 Pascal·Seconds and/or from about 3 Pascal·Seconds to about 10 Pascal·Seconds, as measured at a shear rate of 3,000 sec$^{-1}$ and at the processing temperature (50° C. to 100° C.). The aqueous polymer melt compositions may have a thinning index n value as measured according to the Shear Viscosity of a Polymer Melt Composition Measurement Test Method described herein of from about 0.4 to about 1.0 and/or from about 0.5 to about 0.8.

The aqueous polymer melt compositions may have a temperature of from about 50° C. to about 100° C. and/or from about 65° C. to about 95° C. and/or from about 70° C. to about 90° C. when spinning fibrous elements from the aqueous polymer melt compositions.

In one example, the polymer melt composition of the present invention may comprise from about 30% and/or from about 40% and/or from about 45% and/or from about 50% to about 75% and/or to about 80% and/or to about 85% and/or to about 90% and/or to about 95% and/or to about 99.5% by weight of the aqueous polymer melt composition of a filament-forming polymer, such as a hydroxyl polymer. The filament-forming polymer, such as a hydroxyl polymer, may have a weight average molecular weight greater than 100,000 g/mol as determined by the Weight Average Molecular Weight Test Method described herein prior to any crosslinking.

An acrylamide-based copolymer is present in the aqueous polymer melt compositions and/or may be added to the aqueous polymer melt composition before polymer processing of the aqueous polymer melt composition.

A fast wetting surfactant is present in the aqueous polymer melt compositions and/or may be added to the aqueous polymer melt composition before polymer processing of the aqueous polymer melt composition.

A non-hydroxyl polymer, such as polyacrylamide, may be present in the aqueous polymer melt composition and/or may be added to the aqueous polymer melt composition before polymer processing of the aqueous polymer melt composition.

A crosslinking system comprising a crosslinking agent, such as an imidazolidinone, and optionally, a crosslinking facilitator, such as an ammonium salt, may be present in the aqueous polymer melt composition and/or may be added to the aqueous polymer melt composition before polymer processing of the aqueous polymer melt composition.

"Crosslinking agent" as used herein means any material that is capable of crosslinking a hydroxyl polymer within a polymer melt composition according to the present. Non-limiting examples of suitable crosslinking agents include polycarboxylic acids and/or imidazolidinones.

"Crosslinking facilitator" as used herein means any material that is capable of activating a crosslinking agent thereby transforming the crosslinking agent from its unactivated state to its activated state. In other words, when a crosslinking agent is in its unactivated state, the hydroxyl polymer present in the polymer melt composition does not undergo unacceptable crosslinking. Unacceptable crosslinking causes the shear viscosity and n value to fall outside the ranges specified which are determined according to the Shear Viscosity of a Polymer Melt Composition Measurement Test Method. In the case of imidazolidinone crosslinkers (such as dihydroxyethyleneurea "DHEU"), the pH and the temperature of the Polymer Melt Composition should be in the desired ranges as measured by the Polymer Melt Composition pH Test Method and Temperature of Melt Composition Method as described herein; unacceptable crosslinking occur outside these ranges.

When a crosslinking agent in accordance with the present invention is in its activated state, the hydroxyl polymer present in the polymeric structure may and/or does undergo acceptable crosslinking via the crosslinking agent as determined according to the Initial Total Wet Tensile Test Method described herein.

Upon crosslinking the hydroxyl polymer during the curing step, the crosslinking agent becomes an integral part of the polymeric structure as a result of crosslinking the hydroxyl polymer as shown in the following schematic representation:

Hydroxyl polymer-Crosslinking agent-Hydroxyl polymer

The crosslinking facilitator may include derivatives of the material that may exist after the transformation/activation of the crosslinking agent. For example, a crosslinking facilitator salt being chemically changed to its acid form and vice versa.

Non-limiting examples of suitable crosslinking facilitators include acids having a pKa of less than 6 or salts thereof. The crosslinking facilitators may be Bronsted Acids and/or salts thereof, such as ammonium salts thereof.

In addition, metal salts, such as magnesium and zinc salts, can be used alone or in combination with Bronsted Acids and/or salts thereof, as crosslinking facilitators.

Non-limiting examples of suitable crosslinking facilitators include benzoic acid, citric acid, formic acid, glycolic acid, lactic acid, maleic acid, phthalic acid, phosphoric acid, hypophosphoric acid, succinic acid, and mixtures thereof and/or their salts, such as their ammonium salts, such as ammonium glycolate, ammonium citrate, ammonium chloride, ammonium sulfate Additional non-limiting examples of suitable crosslinking facilitators include glyoxal bisulfite salts, primary amine salts, such as hydroxyethyl ammonium salts, hydroxypropyl ammonium salt, secondary amine salts, ammonium toluene sulfonate, ammonium benzene sulfonate, ammonium xylene sulfonate, magnesium chloride, and zinc chloride.

Non-Limiting Synthesis Example for Making the Aqueous Polymer Melt Composition

An aqueous polymer melt composition of the present invention may be prepared using screw extruders, such as a vented twin screw extruder.

Figure 4A:
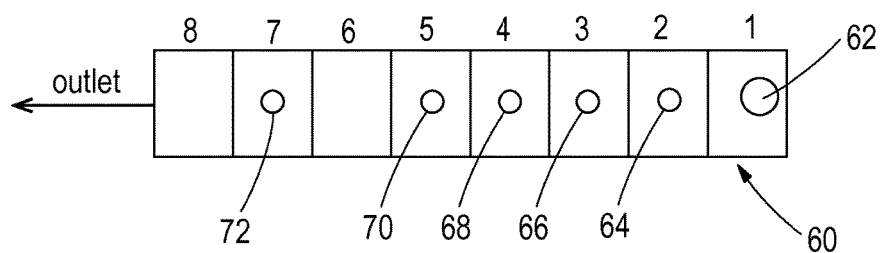
FIG. 4A is a schematic representation of an example of a barrel of a twin screw extruder in accordance with the present invention.

A barrel 60 of an APV Baker (Peterborough, England) 40:1, 58 mm diameter twin screw extruder is schematically illustrated in FIG. 4A. The barrel 60 is separated into eight zones, identified as zones 1-8. The barrel 60 encloses the extrusion screw and mixing elements, schematically shown in FIG. 4B, and serves as a containment vessel during the extrusion process. A solid feed port 62 is disposed in zone 1, a first liquid feed port 64 is disposed in zone 2, a second liquid feed port 66 is disposed in zone 3, a third liquid feed port 68 is disposed in zone 4, and a fourth liquid feed port 70 is disposed in zone 5. A vent 72 is included in zone 7 for cooling and decreasing the liquid, such as water, content of the mixture prior to exiting the extruder. An optional vent stuffer, commercially available from APV Baker, can be employed to prevent the polymer melt composition from exiting through the vent 72. The flow of the aqueous polymer melt composition through the barrel 60 is from zone 1 exiting the barrel 60 at zone 8.

Figure 4B:
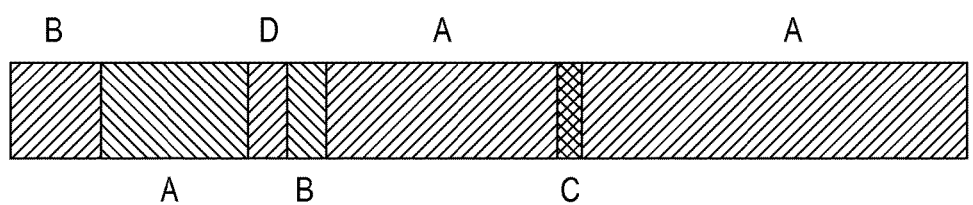
FIG. 4B is a schematic representation of an example of a screw and mixing element configuration for the twin screw extruder of FIG. 4A.

A screw and mixing element configuration for the twin screw extruder is schematically illustrated in FIG. 4B. The twin screw extruder comprises a plurality of twin lead screws (TLS) (designated A and B) and paddles (designated C) and reverse twin lead screws (RTLS) (designated D) installed in series as illustrated in Table 1 below.

TABLE 1

| Zone | Total Length Ratio | Element | Pitch | Length Ratio | Element Type |
|---|---|---|---|---|---|
| 1 | 1.5 | TLS | 1 | 1.5 | A |
| 1 | 3.0 | TLS | 1 | 1.5 | A |
| 1 | 4.5 | TLS | 1 | 1.5 | A |
| 2 | 6.0 | TLS | 1 | 1.5 | A |
| 2 | 7.5 | TLS | 1 | 1.5 | A |
| 2 | 9.0 | TLS | 1 | 1.5 | A |
| 3 | 10.5 | TLS | 1 | 1.5 | A |
| 3 | 12.0 | TLS | 1 | 1.5 | A |
| 3 | 13.0 | TLS | 1 | 1 | A |
| 3 | 14.0 | TLS | 1 | 1 | A |
| 4 | 15.0 | TLS | 1 | 1 | A |
| 4 | 16.0 | TLS | 1 | 1 | A |
| 4 | 16.3 | PADDLE | 0 | 0.25 | C |
| 4 | 16.5 | PADDLE | 0 | 0.25 | C |
| 4 | 18.0 | TLS | 1 | 1.5 | A |
| 4 | 19.5 | TLS | 1 | 1.5 | A |
| 5 | 21.0 | TLS | 1 | 1.5 | A |
| 5 | 22.5 | TLS | 1 | 1.5 | A |
| 5 | 24.0 | TLS | 1 | 1.5 | A |
| 5 | 25.0 | TLS | 1 | 1 | A |
| 6 | 25.3 | TLS | 1 | 0.25 | A |
| 6 | 26.3 | TLS | 1 | 1 | A |
| 6 | 27.3 | TLS | 1 | 1 | A |
| 6 | 28.3 | TLS | 0.5 | 1 | B |
| 6 | 29.3 | TLS | 0.5 | 1 | B |
| 6 | 29.8 | RTLS | 0.5 | 0.5 | D |
| 7 | 30.3 | RTLS | 0.5 | 0.5 | D |
| 7 | 30.8 | RTLS | 0.5 | 0.5 | D |
| 7 | 32.3 | TLS | 1 | 1.5 | A |
| 7 | 33.8 | TLS | 1 | 1.5 | A |
| 7 | 34.8 | TLS | 1 | 1 | A |
| 8 | 35.8 | TLS | 1 | 1 | A |
| 8 | 36.8 | TLS | 0.5 | 1 | B |
| 8 | 37.8 | TLS | 0.5 | 1 | B |
| 8 | 38.8 | TLS | 0.5 | 1 | B |
| 8 | 40.3 | TLS | 0.5 | 1.5 | B |

Screw elements (A-B) are characterized by the number of continuous leads and the pitch of these leads. A lead is a flight (at a given helix angle) that wraps the core of the screw element. The number of leads indicates the number of flights wrapping the core at any given location along the length of the screw. Increasing the number of leads reduces the volumetric capacity of the screw and increases the pressure generating capability of the screw.

The pitch of the screw is the distance needed for a flight to complete one revolution of the core. It is expressed as the number of screw element diameters per one complete revolution of a flight. Decreasing the pitch of the screw increases the pressure generated by the screw and decreases the volumetric capacity of the screw.

The length of a screw element is reported as the ratio of length of the element divided by the diameter of the element.

This example uses TLS and RTLS. Screw element type A is a TLS with a 1.0 pitch and varying length ratios. Screw element type B is a TLS with a 0.5 pitch and varying length ratios.

Bilobal paddles, C, serving as mixing elements, are also included in series with the SLS and TLS screw elements in order to enhance mixing. Paddle C has a length ratio of 1/4. Various configurations of bilobal paddles and reversing elements D, single and twin lead screws threaded in the opposite direction, are used in order to control flow and corresponding mixing time. Screw element D is a RTLS with a 0.5 pitch and a 0.5 length ratio.

In zone 1, one or more filament-forming polymers, such as one or more hydroxyl polymers, are fed into the solid feed port 62 at a rate of 330 grams/minute using a K-Tron (Pitman, N.J.) loss-in-weight feeder. These hydroxyl polymers are combined inside the extruder (zone 2) with a fast wetting surfactant (Aerosol® MA-80) added at liquid feed port 64 (zone 2) at a rate of 12 grams/minute. Water, an external plasticizer, is added at the liquid feed port 66 (zone 3) at a rate of 160 grams/minute using a Milton Roy (Ivyland, Pa.) diaphragm pump (1.9 gallon per hour pump head) to form a hydroxyl polymer/fast wetting surfactant/water slurry. A crosslinking facilitator, such as ammonium chloride, may be added to the slurry at liquid feed port 66 (zone 3) also. Another filament-forming polymer, such as a hydroxyl polymer, for example polyvinyl alcohol, may be added to the slurry at liquid feed port 68 (zone 4). A non-hydroxyl polymer, such as polyacrylamide may be added to the slurry at liquid feed port 70 (zone 5). Additional additives such as other surfactants, other non-hydroxyl polymers, other salts and/or acids may be added at various feed ports along the length of the barrel 60. This slurry is then conveyed down the barrel 60 of the extruder and cooked to produce an aqueous polymer melt composition comprising a melt processed hydroxyl polymer and a fast wetting surfactant. Table 2 describes the temperature, pressure, and corresponding function of each zone of the extruder.

TABLE 2

| Zone | Temp. (° F.) | Pressure | Description of Screw | Purpose |
|---|---|---|---|---|
| 1 | 70 | Low | Feeding/Conveying | Feeding and Mixing |
| 2 | 70 | Low | Conveying | Mixing and Conveying |
| 3 | 70 | Low | Conveying | Mixing and Conveying |
| 4 | 130 | Low | Pressure/Decreased Conveying | Conveying and Heating |
| 5 | 355 | Medium | Pressure Generating | Cooking at Pressure and Temperature |
| 6 | 355 | High | Reversing | Cooking at Pressure and Temperature |
| 7 | 355 | Low | Conveying | Cooling and Conveying (with venting) |
| 8 | 355 | Low | Pressure Generating | Conveying |

Figure 5A:
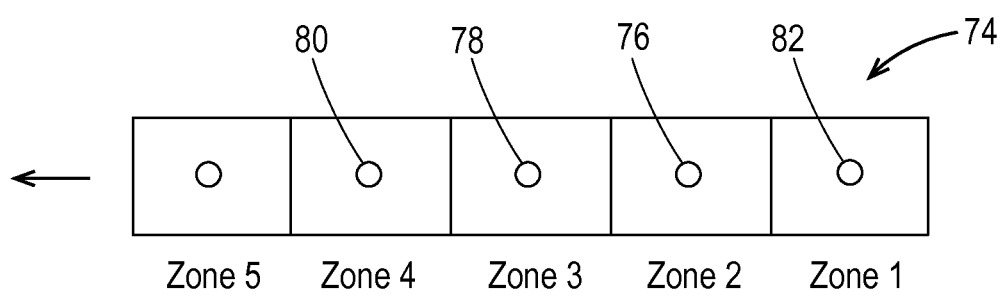
FIG. 5A is a schematic representation of another example of a barrel of a twin screw extruder suitable for use in the present invention.
Figure 5B:
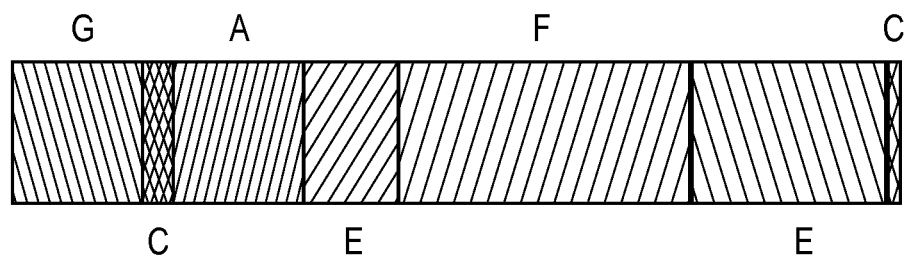
FIG. 5B is a schematic representation of another example of a screw and mixing element configuration suitable for use in the barrel of FIG. 5A.

After the aqueous polymer melt composition exits the first extruder, part of the aqueous polymer melt composition is dumped and another part (450 g) is fed into a Mahr (Charlotte, N.C.) gear pump and pumped to a second extruder. The second extruder provides a means to cool the polymer melt composition by venting the polymer melt composition to atmospheric pressure and provides additional points to incorporate additives. A barrel 74 of an APV Baker (Peterborough, England) 13:1, 70 mm diameter twin screw extruder is schematically illustrated in FIG. 5A as the second extruder. The barrel 74 is separated into five zones, identified as zones 1-5. The barrel 74 encloses the extrusion screw and mixing elements, schematically shown in FIG. 5B, and serves as containment vessel during the extrusion process. A first liquid feed port 76 is disposed in zone 2, a second liquid feed port 78 is disposed in zone 3, and a third liquid feed port 80 is disposed in zone 4. A vent 82 is included in zone 1 for cooling and decreasing the liquid, such as water, content of the mixture prior to exiting the second extruder. An optional vent stuffer, commercially available from APV Baker, can be employed to prevent the aqueous polymer melt composition from exiting through the vent 82. The flow of the aqueous polymer melt composition through the barrel 74 is from zone 2 exiting the barrel 74 at zone 5.

A screw and mixing element configuration for the second extruder consists of twin lead screws (TLS) (designated A, E, F), paddles (designated C), and single lead screws (SLS) (designated G) installed in series as illustrated in Table 3 below.

TABLE 3

| Zone | Total Length Ratio | Element | Pitch | Length Ratio | Element Type | Purpose |
|---|---|---|---|---|---|---|
| 1 | 0.25 | Paddle | 0 | 0.25 | C | Mixing |
| 1 | 1.75 | TLS | 2 | 1.5 | E | Vent Location |
| 2 | 3.25 | TLS | 2 | 1.5 | E | Conveying |
| 2 | 4.75 | TLS | 3 | 1.5 | F | Feed Inlet Location |
| 3 | 6.25 | TLS | 3 | 1.5 | F | Conveying |
| 3 | 7.75 | TLS | 3 | 1.5 | F | Conveying |
| 4 | 9.25 | TLS | 2 | 1.5 | E | Conveying |
| 4 | 10.25 | TLS | 1 | 1 | A | Conveying |
| 4 | 11.25 | TLS | 1 | 1 | A | Conveying |
| 4 | 11.38 | Paddle | 0 | 0.125 | C | Mixing |
| 4 | 11.50 | Paddle | 0 | 0.125 | C | Mixing |
| 5 | 11.63 | Paddle | 0 | 0.125 | C | Mixing |
| 5 | 11.75 | Paddle | 0 | 0.125 | C | Mixing |
| 5 | 12.75 | SLS | 0.5 | 1 | G | Conveying |
| 5 | 13.75 | SLS | 0.5 | 1 | G | Conveying |

The aqueous polymer melt composition comprising the melt processed hydroxyl polymer and fast wetting surfactant coming from the first extruder is fed into the second extruder at a point about 5 L/D down the barrel, liquid feed port 76 (zone 2). A vent 82 open to atmospheric pressure is situated at about 1.5 L/D down the barrel 74 (zone 1). Some water vapor escapes from the aqueous polymer melt composition and exits through the vent 82. Water, an external plasticizer, and a crosslinking facilitator, such as ammonium chloride, may be added at the liquid feed port 78 (zone 3). A non-hydroxyl polymer, such as polyacrylamide, may be added at liquid feed port 80 (zone 4). Additional additives such as other surfactants, other non-hydroxyl polymers, other salts and/or acids may be added at various feed ports along the length of the barrel 74. The aqueous polymer melt composition is then conveyed through the extruder to the end of the barrel 74 (zone 5).

At least a portion of the aqueous polymer melt composition is then dumped and another part (400 g) is fed into a Mahr (Charlotte, N.C.) gear pump and pumped into a SMX style static mixer (Koch-Glitsch, Woodridge, Ill.). The static mixer is used to combine additional additives such as crosslinking agents, for example an imidazolidinone, crosslinking facilitators, such as ammonium chloride, external plasticizers, such as water, with the aqueous polymer melt composition comprising the melt processed hydroxyl polymer and fast wetting surfactant. The additives are pumped into the static mixer via PREP 100 HPLC pumps (Chrom Tech, Apple Valley Minn.). These pumps provide high pressure, low volume addition capability. The aqueous polymer melt composition of the present invention is now ready to be processed by a polymer processing operation.

"Polymer processing" as used herein means any operation and/or process by which a polymeric structure comprising a processed hydroxyl polymer is formed from an aqueous polymer melt composition comprising a melt processed hydroxyl polymer. Non-limiting examples of polymer processing operations include extrusion, molding and/or fiber spinning. Extrusion and molding (either casting or blown), typically produce films, sheets and various profile extrusions. Molding may include injection molding, blown molding and/or compression molding. Fiber spinning may include spun bonding, melt blowing, rotary spinning, continuous filament producing and/or tow fiber producing.

A "processed hydroxyl polymer" as used herein means any hydroxyl polymer that has undergone a melt processing operation and a subsequent polymer processing operation.

The aqueous polymer melt composition can be subjected to one or more polymer processing operations such that the polymer melt composition is processed into a polymeric structure comprising the hydroxyl polymer and a crosslinking system according to the present invention.

"Polymeric structure" as used herein means any physical structure formed as a result of processing an aqueous polymer melt composition in accordance with the present invention. Non-limiting examples of polymeric structures in accordance with the present invention include fibrous elements (such as filaments and/or fibers), films and/or foams.

A crosslinking system via a crosslinking agent and optionally a crosslinking facilitator may crosslink the processed hydroxyl polymers together to produce the polymeric structure of the present invention, with or without being subjected to a curing step. In other words, the crosslinking system in accordance with the present invention acceptably crosslinks the processed hydroxyl polymers of a processed polymer melt composition together via the crosslinking agent to form an integral polymeric structure, such as a fibrous element. The crosslinking agent can function as a "building block" for the polymeric structure. In one example, without the crosslinking agent, no polymeric structure in accordance with the present invention could be formed.

Polymeric structures of the present invention do not include coatings and/or other surface treatments that are applied to a pre-existing form, such as a coating on a fibrous element, film or foam. However, in one example of the present invention, a polymeric structure, such as a fibrous element, in accordance with the present invention may be coated and/or surface treated with a crosslinking system of the present invention.

In one example, the polymeric structure produced via a polymer processing operation may be cured at a curing temperature of from about 110° C. to about 215° C. and/or from about 110° C. to about 200° C. and/or from about 120° C. to about 195° C. and/or from about 130° C. to about 185° C. for a time period of from about 0.01 and/or 1 and/or 5 and/or 15 seconds to about 60 minutes and/or from about 20 seconds to about 45 minutes and/or from about 30 seconds to about 30 minutes. Alternative curing methods may include radiation methods such as UV, e-beam, IR and other temperature-raising methods.

Further, the polymeric structure may also be cured at room temperature for days, either after curing at above room temperature or instead of curing at above room temperature.

The polymeric structures of the present invention may include melt spun fibers and/or spunbond fibers, staple fibers, hollow fibers, shaped fibers, such as multi-lobal fibers and multicomponent fibers, especially bicomponent fibers. The multicomponent fibers, especially bicomponent fibers, may be in a side-by-side, sheath-core, segmented pie, ribbon, islands-in-the-sea configuration, or any combination thereof. The sheath may be continuous or non-continuous around the core. The ratio of the weight of the sheath to the core can be from about 5:95 to about 95:5. The fibers of the present invention may have different geometries that include round, elliptical, star shaped, rectangular, and other various eccentricities.

One or more polymeric structures of the present invention may be incorporated into a multi-polymeric structure product, such as a fibrous structure and/or web, if the polymeric structures are in the form of fibers. Such a multi-polymeric structure product may ultimately be incorporated into a commercial product, such as a single- or multi-ply sanitary tissue product, such as facial tissue, bath tissue, paper towels and/or wipes, feminine care products, diapers, writing papers, cores, such as tissue cores, and other types of paper products.

Non-limiting examples of processes for preparing polymeric structures in accordance with the present invention follow.

Figure 6:
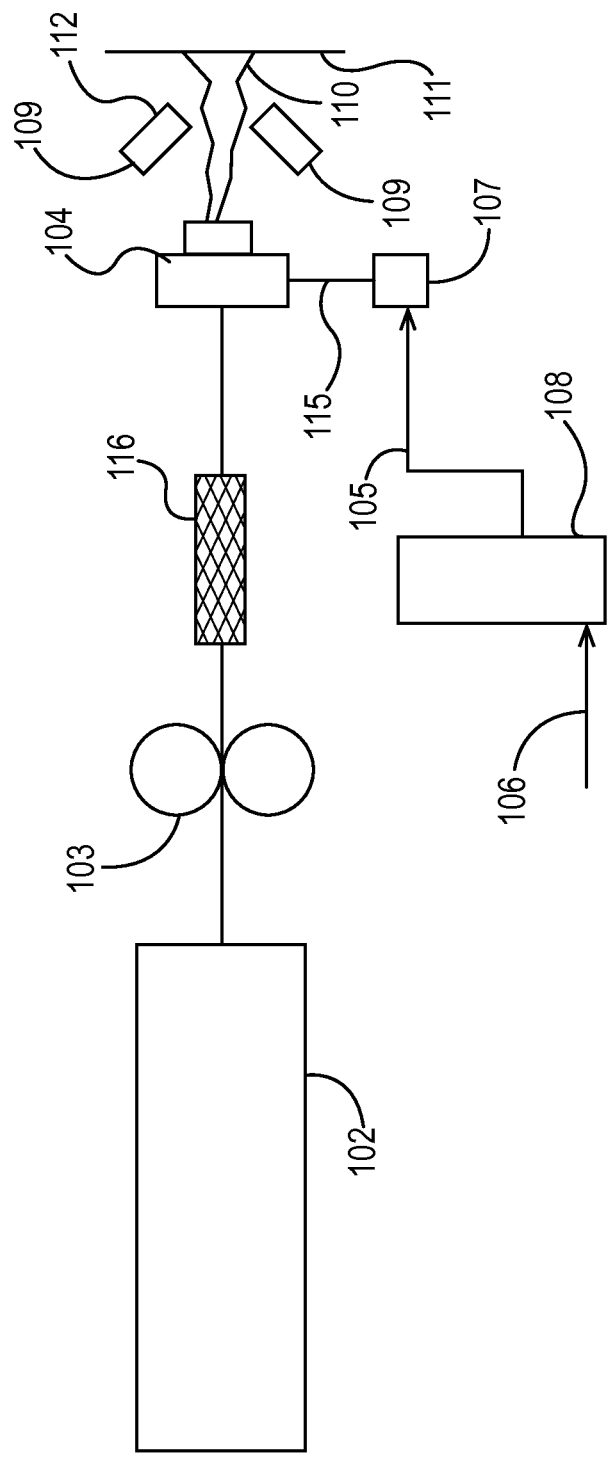
FIG. 6 is a schematic representation of an example of a process for synthesizing a fibrous element in accordance with the present invention.

An aqueous polymer melt composition comprising a melt processed hydroxyl polymer and a fast wetting surfactant is prepared according to the Synthesis of an Aqueous Polymer Melt Composition described above. As shown in FIG. 6, the aqueous polymer melt composition may be processed into a fibrous element. The aqueous polymer melt composition present in an extruder 102 is pumped to a die 104 using pump 103, such as a Zenith®, type PEP II, having a capacity of 10 cubic centimeters per revolution (cc/rev), manufactured by Parker Hannifin Corporation, Zenith Pumps division, of Sanford, N.C., USA. The aqueous polymer melt composition's flow to die 104 is controlled by adjusting the number of revolutions per minute (rpm) of the pump 103. Pipes connecting the extruder 102, the pump 103, the die 104, and optionally a mixer 116 are electrically heated and thermostatically controlled to 65° C.

Figure 7:
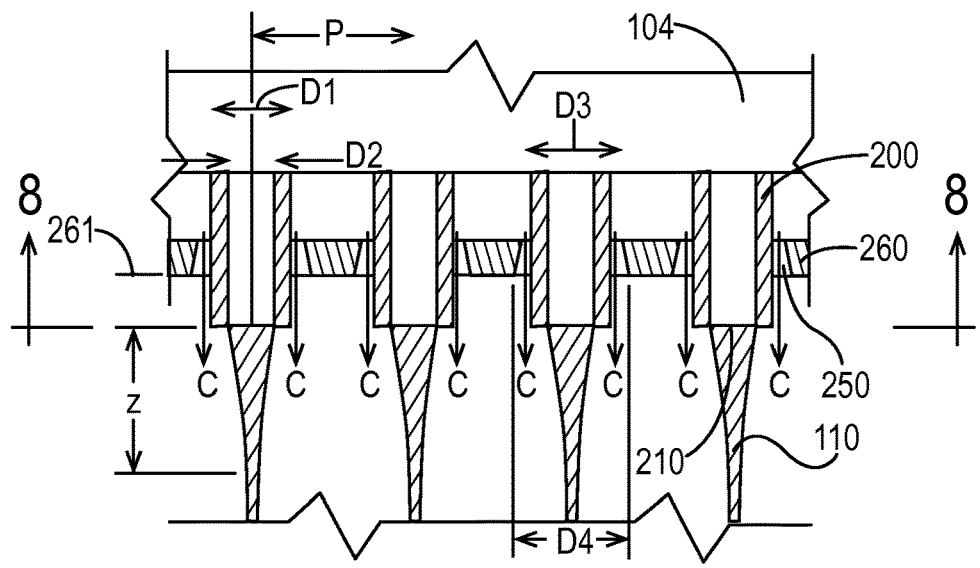
FIG. 7 is a schematic representation of a partial side view of the process shown in FIG. 6 showing an example of an attenuation zone.
Figure 8:
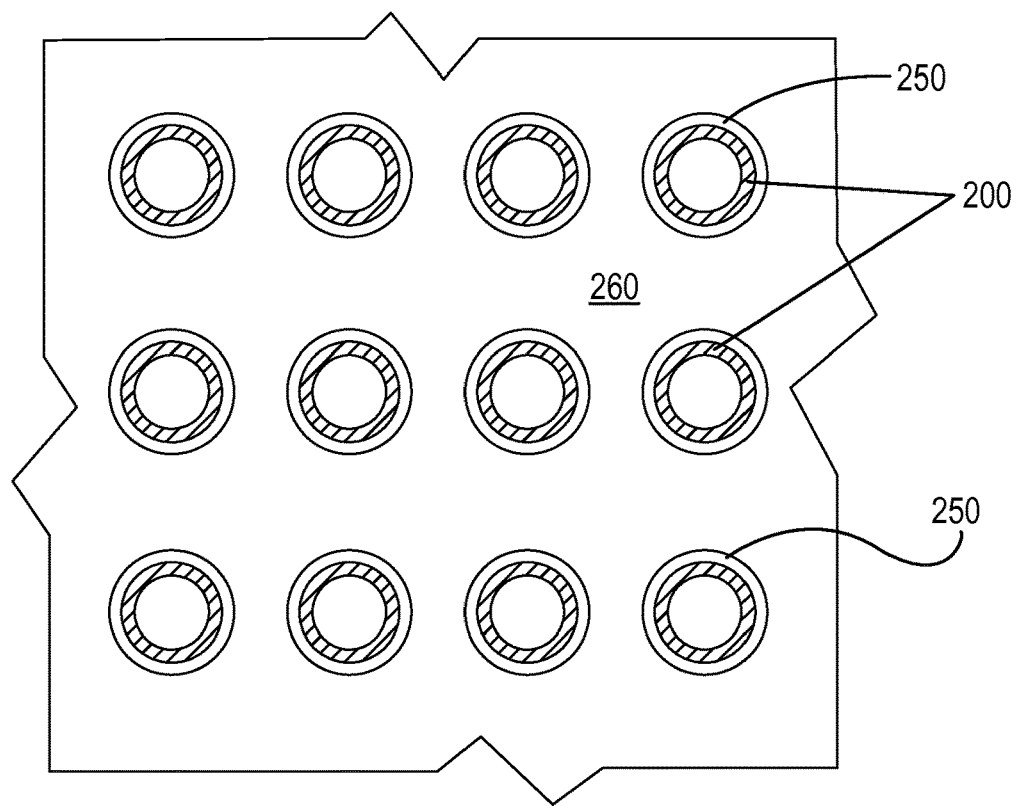
FIG. 8 is a schematic plan view taken along lines 8-8 of FIG. 7 and showing one possible arrangement of a plurality of extrusion nozzles arranged to provide fibrous elements of the present invention.
Figure 9:
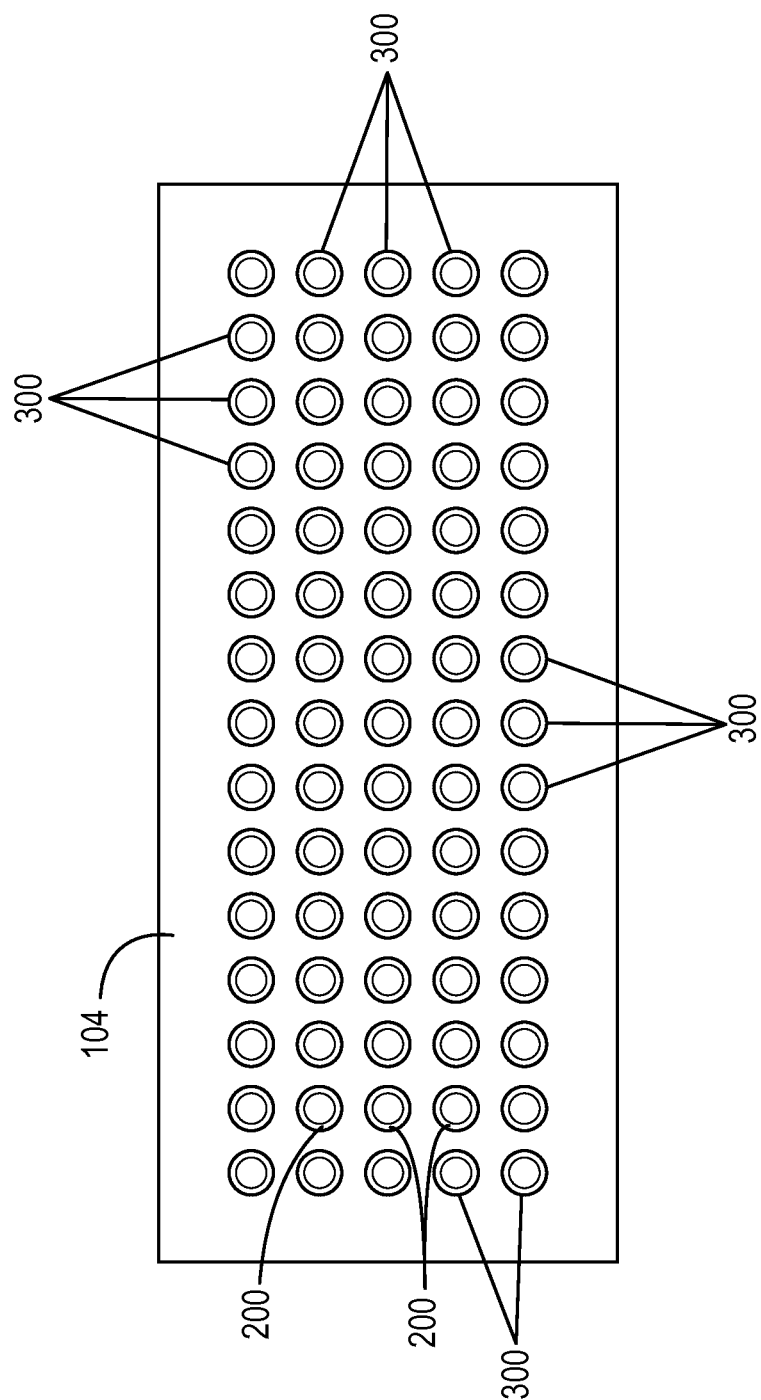
FIG. 9 is a view similar to that of FIG. 8 and showing one possible arrangement of orifices for providing a boundary air around the attenuation zone shown in FIG. 7.

The die 104 has several rows of circular extrusion nozzles 200 spaced from one another at a pitch P (FIG. 7) of about 2.489 millimeters (about 0.098 inches). The nozzles are arranged in a staggered grid with a spacing of 2.489 millimeters (about 0.098 inches) within rows and a spacing of 2.159 millimeters (about 0.085 inches) between rows. The nozzles 200 have individual inner diameters D2 of about 0.254 millimeters (about 0.010 inches) and individual outside diameters (D1) of about 0.813 millimeters (about 0.032 inches). Each individual nozzle 200 is encircled by an annular orifice 250 formed in a plate 260 (FIGS. 7 and 8) having a thickness of about 1.9 millimeters (about 0.075 inches). A pattern of a plurality of the orifices 250 in the plate 260 correspond to a pattern of extrusion nozzles 200. Once the orifice plate is combined with the dies, the resulting area for airflow is about 36 percent. The plate 260 is fixed so that the embryonic filaments 110 being extruded through the nozzles 200 are surrounded and attenuated by generally cylindrical, humidified air streams supplied through the orifices 250. The nozzles can extend to a distance from about 1.5 mm to about 4 mm, and more specifically from about 2 mm to about 3 mm, beyond a surface 261 of the plate 260 (FIG. 7). As shown in FIG. 9, a plurality of boundary-air orifices 300, is formed by plugging nozzles of two outside rows on each side of the plurality of nozzles, as viewed in plane, so that each of the boundary-layer orifice comprised a annular aperture 250 described herein above. Additionally, every other row and every other column of the remaining capillary nozzles are blocked, increasing the spacing between active capillary nozzles As shown in FIG. 6, attenuation air can be provided by heating compressed air from a source 106 by an electrical-resistance heater 108, for example, a heater manufactured by Chromalox, Division of Emerson Electric, of Pittsburgh, Pa., USA. An appropriate quantity of steam 105 at an absolute pressure of from about 240 to about 420 kiloPascals (kPa), controlled by a globe valve (not shown), is added to saturate or nearly saturate the heated air at the conditions in the electrically heated, thermostatically controlled delivery pipe 115. Condensate is removed in an electrically heated, thermostatically controlled, separator 107. The attenuating air has an absolute pressure from about 130 kPa to about 310 kPa, measured in the pipe 115. The filaments 110 being extruded have a moisture content of from about 20% and/or from about 25% to about 50% and/or to about 55% by weight. The filaments 110 are dried by a drying air stream 109 having a temperature from about 149° C. (about 300° F.) to about 315° C. (about 600° F.) by an electrical resistance heater (not shown) supplied through drying nozzles 112 and discharged at an angle generally perpendicular relative to the general orientation of the embryonic fibers being extruded. The filaments 110 are dried from about 45% moisture content to about 15% moisture content (i.e., from a consistency of about 55% to a consistency of about 85%) and are collected on a collection device 111, such as, for example, a movable foraminous belt.

The process parameters are as follows in Table 4.

TABLE 4

| Sample | Units | |
|---|---|---|
| Attenuation Air Flow Rate | G/min | 9000 |
| Attenuation Air Temperature | ° C. | 65 |
| Attenuation Steam Flow Rate | G/min | 1800 |
| Attenuation Steam Gage Pressure | kPa | 213 |
| Attenuation Gage Pressure in Delivery Pipe | kPa | 14 |
| Attenuation Exit Temperature | ° C. | 65 |
| Solution Pump Speed | Revs/min | 12 |
| Solution Flow | G/min/hole | 0.18 |
| Drying Air Flow Rate | g/min | 17000 |
| Air Duct Type | | Slots |
| Air Duct Dimensions | mm | 356 × 127 |
| Velocity via Pitot-Static Tube | M/s | 65 |
| Drying Air Temperature at Heater | ° C. | 260 |
| Dry Duct Position from Die | mm | 80 |
| Drying Duct Angle Relative to Fibers | degrees | 0 |
| Drying Duct to Drying Duct Spacing | mm | 205 |
| Die to Forming Box distance | Mm | 610 |
| Forming Box Machine direction Length | Mm | 635 |
| Forming Box Cross Direction Width | Mm | 380 |
| Forming Box Flowrate | g/min | 41000 |

Non-Limiting Examples of Fibrous Structures of Present Invention

The materials used in the Examples are as follows:

Hydroxyl Polymer-CPI 050820-156 is an acid-thinned, dent corn starch with a weight average molecular weight of 2,000,000 g/mol supplied by Corn Products International, Westchester, Ill.

Non-hydroxyl Polymer-Hyperfloc NF301, a nonionic polyacrylamide (PAAM) has a weight average molecular weight between 5,000,000 and 6,000,000 g/mol, is supplied by Hychem, Inc., Tampa, Fla.

Non-hydroxyl Polymer-Hyperfloc NF221 PAAM a non-ionic polyacrylamide (PAAM) has a weight average molecular weight between 4,000,000 and 5,000,000 g/mol, is supplied by Hychem, Inc., Tampa, Fla.

Surfactant-Aerosol MA-80-PG is an anionic sodium dihexyl sulfosuccinate surfactant supplied by Cytec Industries, Inc., Woodland Park, N.J.

Crosslinking Agent-Dihydroxyethyleneurea (DHEU)

EXAMPLE 1

Comparative Example

In a 40:1 APV Baker twin-screw extruder with eight temperature zones, a 2.2 wt % NF301 PAAM solution is mixed with CPI 050820-156 starch, ammonium chloride, Aerosol MA-80-PG surfactant, and water in zone 1. This mixture is then conveyed down the barrel through zones 2 through 8 and cooked into a melt-processed hydroxyl polymer composition. The composition in the extruder is 42% water where the make-up of solids is 97.2% CPI 050820-156, 1.5% Aerosol MA-80-PG, 0.8% Hyperfloc NF301 polyacrylamide, and 0.5% ammonium chloride. The extruder barrel (FIG. 4A) temperature setpoints for each zone are shown below in Table 5.

TABLE 5

| Zone | 1 | 2 | 3 | 4 | 5 | 6 | 7 | 8 |
|---|---|---|---|---|---|---|---|---|
| Temperature (° F.) | 60 | 60 | 60 | 120 | 320 | 320 | 360 | 360 |

The temperature of the melt exiting the 40:1 extruder is between 340 and 345° F. From the extruder, the melt is fed to a Mahr gear pump, and then delivered to a second extruder. The second extruder is a 13:1 APV Baker twin screw, which serves to cool the melt by venting a stream to atmospheric pressure. The second extruder also serves as a location for additives to the aqueous hydroxyl polymer melt composition. Particularly, a second stream of 2.2 wt % Hyperfloc NF301 polyacrylamide is introduced at a level of 0.3% on a solids basis. This raises the total Hyperfloc NF301 level to 1.1% of the solids. The material that is not vented is conveyed down the extruder to a second Mahr melt pump. From here, the hydroxyl polymer melt is delivered to a series of static mixers where a cross-linker, activator, and water are added. The melt composition at this point in the process is 50-55% total solids. On a solids basis the melt is comprised of 90.5% CPI 050820-156 starch, 5% cross-linker, 2% ammonium chloride, 1.5% surfactant, and 1.0% Hyperfloc NF301 PAAM. From the static mixers the composition is delivered to a melt blowing die via a melt pump.

The resulting filaments display an elongation at rupture (EAR) of 53% as determined by the Elongation at Rupture Test Method. The filaments are collected on a collection device, such as a fabric, for example a through-air-drying fabric, and/or belt, for example a patterned belt, to form a fibrous structure, which after curing, exhibits a basis weight of 24 g/m2 as measured according to the Basis Weight Test Method described herein and a Fail Total Energy Absorbed (Fail TEA) of less than 35 Win.

EXAMPLE 2

Inventive Example

An aqueous polymer melt composition is prepared according to Example 1 except an acrylamide-based copolymer comprising an acrylamide monomer and a N-hydroxyethyl acrylamide monomer is added at the 13:1 APV or second extruder instead of NF301 polyacrylamide, which is a homopolymer. The acrylamide-based copolymer of acrylamide monomer and N-hydroxyethyl acrylamide monomer is synthesized by free radical polymerization. The two monomers are dissolved in reverse osmosis treated water that is degassed using a nitrogen sparge and heated to a temperature of 49° C. The weight ratio of acrylamide monomer and N-hydroxethyl acrylamide monomer is 80:20 respectively, and the total solids concentration is between 4.5 and 5.0 wt %. The reaction mixture is maintained at 49° C. and stirred under further nitrogen sparging for 1 hour at which point a 2,2'-azo-bis(2-methylpropionamidine)dihydrochloride (V50) initiator is added at 0.45 wt % on a solids basis. After 16 hours of reaction time under a nitrogen blanket, a second V50 charge is added at 0.20 wt % on a solids basis at which time the reaction temperature is raised to 70° C. After 6 hours of further reaction time the polymerization is terminated by turning off the heating source and opening the reaction mixture to the atmosphere. The resulting acrylamide-based copolymer has weight average molecular weight between 2,000,000 and 4,000,000 as determined by the Molecular Weight and Molecular Weight Distribution Test Method described herein.

As in Example 1, the aqueous polymer melt composition exiting the first extruder is 97.2% CPI 050820-156, 1.5% Aerosol MA-80-PG, 0.8% Hyperfloc NF301 polyacrylamide (a homopolymer), and 0.5% ammonium chloride on a solids basis. From here, the aqueous polymer melt composition is sent to the second extruder where an acrylamide-based copolymer of acrylamide and N-hydroxethyl acrylamide is added. After the aqueous polymer melt composition exits the second extruder, a crosslinking agent, and a crosslinking activator are added in the static mixers as described in Example 1. The resulting aqueous polymer melt composition is 50-55% total solids at this point. On a solids basis the aqueous polymer melt composition is comprised of 91.1% CPI 050820-156 starch, 5% cross-linker, 2% ammonium chloride, 1.5% surfactant, 0.8% Hyperfloc NF221 PAAM, and 0.5% acrylamide-based copolymer of acrylamide and N-hydroxethyl acrylamide. From the static mixers the aqueous polymer melt composition is delivered to a melt blowing die via a melt pump. The resulting filaments display an elongation at rupture (EAR) of greater than 55% and/or greater than 60% and/or greater than 70% and/or greater than 80% and/or about 87% as determined by the Elongation at Rupture Test Method described herein. The filaments are collected on a collection device, such as a fabric, for example a through-air-drying fabric, and/or belt, for example a patterned belt, to form a fibrous structure, which after curing, exhibits a basis weight of 24 g/m2 as measured according to the Basis Weight Test Method described herein and a Fail Total Energy Absorbed (Fail TEA) of greater than 37 g/in and/or greater than 40 g/in and/or greater than 45 g/in as measured according to the Elongation/Tensile Strength/ TEA/Tangent Modulus Test Method described herein.

Addition of the acrylamide-based copolymer in Example 2 results in higher yielding filaments that have superior elongation at rupture properties than filaments melt blown from aqueous polymer melt compositions that do not contain the acrylamide-based copolymer. The higher elongating filaments translate to fibrous structures with increased tensile strength and fail stretch (elongation). It is believed that the pendant hydroxyl groups on the N-hydroxethyl acrylamide monomeric unit of the acrylamide-based copolymer, which readily react with the crosslinking agent in the filament upon curing thereby creating chemical crosslinks that can either couple an acrylamide-based copolymer chain and a hydroxyl polymer chain, such as a polysaccharide chain, or two acrylamide-based copolymer chains. This is in contrast to the filaments in Example 1 where the chemical crosslinks primarily occur between two hydroxyl polymer chains, for example two polysaccharide chains, upon curing.

Figure 10:
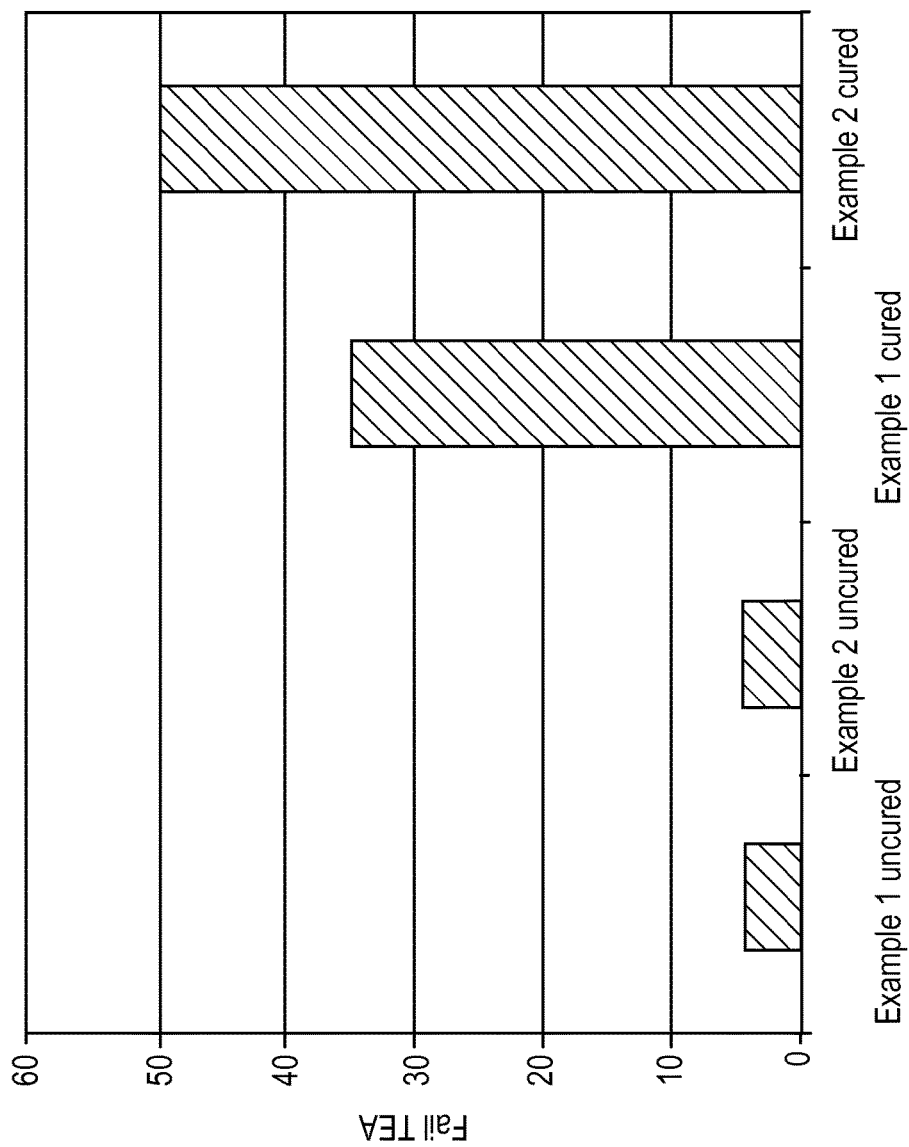
FIG. 10 is a plot of Fail TEA for an example of a fibrous structure of the present invention.

The acrylamide functional group from the polyacrylamide can react with the crosslinking agent, just to a lesser extent than the pendant hydroxyl group in the acrylamide-based copolymer of Example 2. FIG. 10 shows that prior to curing (the crosslinking reaction), the fibrous structures produced in Example 1 and Example 2 display the same Fail TEA. However, after the fibrous structures are cured (crosslinked) the Fail TEA increases for both cases, but the fibrous structure in Example 2 increased significantly more than the fibrous structure in Example 1.

Without wishing to be bound by theory, it is believed that a stronger network structure would result from crosslinking a flexible, high molecular weight polymer with a reactive functional group, such as the acrylamide-based copolymer, with a hydroxyl polymer matrix, such as a polysaccharide matrix, compared to the resulting fibrous structure formed from crosslinking a hydroxyl polymer matrix, such as a polysaccharide matrix, in the absence of such a high molecular weight polymer with a reactive functional group, such as the acrylamide-based copolymer. An interpenetrating network structure is formed through a combination of entanglements and chemical crosslinks between the acrylamide-based copolymer and the hydroxyl polymer, for example, the polysaccharide. The resulting filaments possess a higher elongation at rupture, and the resulting fibrous structures possess improved tensile strength and fail stretch (elongation), which is shown in the improved Fail TEA.

It is also believed that the non-polar ethyl groups on the N-hydroxyethyl acrylamide repeat unit forms reversible, hydrophobic associations with itself in aqueous solutions, such as the aqueous polymer melt compositions of the present invention. The hydrophobic-hydrophobic interactions between the acrylamide-based copolymer chains are susceptible to breaking under mechanical stress, however unlike covalent bonds they are capable of reforming after breaking. Thus the hydrophobic associations serve as a reversible mechanism to maintain an effective polymer molecular weight in the presence of high shear and elongational stresses. Maintaining a polymer with a high effective chain length through the melt processing step also results in fibrous structures with improved strength properties.

EXAMPLE 3

Inventive Example

An aqueous polymer melt composition is prepared according to Example 1 except an acrylamide-based copolymer of acrylamide and 2-hydroxyethyl acrylate is added at the 13:1 APV or second extruder instead of NF301 polyacrylamide, which is a homopolymer. The acrylamide-based copolymer of acrylamide and 2-hydroxyethyl acrylate is synthesized by free radical polymerization. The two monomers are dissolved in reverse osmosis treated water that is degassed using a nitrogen sparge and heated to a temperature of 49° C. The weight ratio of acrylamide and 2-hydroxethyl acrylate is 80:20 respectively, and the total solids concentration is between 4.5 and 5.0 wt %. The reaction mixture is maintained at 49° C. and stirred under further nitrogen sparging for 1 hour at which point a 2,2'-azo-bis(2-methylpropionamidine) dihydrochloride (V50) initiator is added at 0.45 wt % on a solids basis. After 16 hours of reaction time under a nitrogen blanket, a second V50 charge is added at 0.20 wt % on a solids basis at which time the reaction temperature is raised to 70° C. After 6 hours of further reaction time the polymerization is terminated by turning off the heating source and opening the reaction mixture to the atmosphere. The resulting acrylamide-based copolymer exhibits a weight average molecular weight between 2,000,000 and 4,000,000 as determined by the Molecular Weight and Molecular Weight Distribution Test Method described herein.

The aqueous polymer melt composition is processed exactly as in Example 2 except the final aqueous polymer melt composition contains 0.5% acrylamide-based copolymer of acrylamide and 2-hdyroxyethyl acrylate in place of the acrylamide-based copolymer of acrylamide and N-hydroxyethyl acrylamide of Example 2. From the static mixers, the aqueous polymer melt composition is delivered to a melt blowing die via a melt pump. The resulting filaments display an elongation at rupture (EAR) as determined by the Elongation at Rupture Test Method described herein the same as the filaments of Example 2. The filaments are collected on a collection device, such as a fabric, for example a through-air-drying fabric, and/or belt, for example a patterned belt, to form a fibrous structure, which after curing, exhibits a basis weight of 24 g/m2 as measured according to the Basis Weight Test Method described herein and a Fail Total Energy Absorbed (Fail TEA) as measured according to the Elongation/Tensile Strength/TEA/Tangent Modulus Test Method described herein the same as Example 2.

EXAMPLE 4

Inventive Example

An aqueous polymer melt composition is prepared according to Example 1 except an acrylamide-based copolymer of acrylamide and 4-hydroxybutyl acrylate is added at the 13:1 APV or second extruder instead of NF301 polyacrylamide, which is a homopolymer. The acrylamide-based copolymer of acrylamide and 4-hydroxybutyl acrylate is synthesized by free radical polymerization in an acrylamide monomer to 4-hydroxybutyl acrylate monomer weight ratio of 98.05:1.95. The two monomers are dissolved in reverse osmosis treated water that is degassed using a nitrogen sparge and heated to a temperature of 49° C. The weight ratio of acrylamide and 4-hydroxbutyl acrylate is 98.05:1.95 respectively, and the total solids concentration is between 4.5 and 5.0 wt %. The reaction mixture is maintained at 49° C. and stirred under further nitrogen sparging for 1 hour at which point a 2,2'-azo-bis(2-methylpropionamidine) dihydrochloride (V50) initiator is added at 0.45 wt % on a solids basis. After 16 hours of reaction time under a nitrogen blanket, a second V50 charge is added at 0.20 wt % on a solids basis at which time the reaction temperature is raised to 70° C. After 6 hours of further reaction time the polymerization is terminated by turning off the heating source and opening the reaction mixture to the atmosphere. The resulting acrylamide-based copolymer exhibits a weight average molecular weight between 2,000,000 and 4,000,000 as determined by the Molecular Weight and Molecular Weight Distribution Test Method described herein.

The aqueous polymer melt composition is processed exactly as in Example 2 except the final aqueous polymer melt composition contains 0.5% acrylamide-based copolymer of acrylamide and 4-hydroxybutyl acrylate in place of the acrylamide-based copolymer of acrylamide and N-hydroxyethyl acrylamide of Example 2. From the static mixers, the aqueous polymer melt composition is delivered to a melt blowing die via a melt pump. The resulting filaments display an elongation at rupture (EAR) of greater than 55% as determined by the Elongation at Rupture Test Method described herein. The filaments are collected on a collection device, such as a fabric, for example a through-air-drying fabric, and/or belt, for example a patterned belt, to form a fibrous structure, which after curing, exhibits a basis weight of 24 g/m2 as measured according to the Basis Weight Test Method described herein and a Fail Total Energy Absorbed (Fail TEA) of greater than 37 g/in and/or greater than 40 g/in and/or greater than 45 g/in and/or greater than 50 g/in and/or greater than 55 g/in as measured according to the Elongation/Tensile Strength/TEA/Tangent Modulus Test Method described herein.

The Fail TEA of the fibrous structure of Example 4 is greater than the Fail TEA of the fibrous structures of Examples 2 and 3. Without wishing to be bound by theory, it is believed that the butyl group of the 4-hydroxybutyl acrylate monomeric unit of the acrylamide-based copolymer forms stronger hydrophobic associations compared to the ethyl groups of the N-hydroxyethyl acrylamide monomeric unit (Example 2) and the 2-hydroxyethyl acrylate monomeric unit (Example 3) of the acrylamide-based copolymers of Examples 2 and 3. Consequently, the acrylamide-based copolymer of Example 4 requires a lower concentration of the hydroxyl-containing repeat unit than the acrylamide-based copolymers of Examples 2 and 3 in order to achieve the desired strength property of the fibrous structure.

Test Methods

Unless otherwise specified, all tests described herein including those described under the Definitions section and the following test methods are conducted on samples that have been conditioned in a conditioned room at a temperature of 23° C.±1.0° C. and a relative humidity of 50%±2% for a minimum of 12 hours prior to the test. All plastic and paper board packaging articles of manufacture, if any, must be carefully removed from the samples prior to testing. The samples tested are "usable units." "Usable units" as used herein means sheets, flats from roll stock, pre-converted flats, and/or single or multi-ply products. Except where noted all tests are conducted in such conditioned room, all tests are conducted under the same environmental conditions and in such conditioned room. Discard any damaged product. Do not test samples that have defects such as wrinkles, tears, holes, and like. All instruments are calibrated according to manufacturer's specifications.

Shear Viscosity of a Polymer Melt Composition Measurement Test Method

The shear viscosity of a polymer melt composition comprising a crosslinking system is measured using a capillary rheometer, Goettfert Rheograph 6000, manufactured by Goettfert USA of Rock Hill S.C., USA. The measurements are conducted using a capillary die having a diameter D of 1.0 mm and a length L of 30 mm (i.e., L/D=30). The die is attached to the lower end of the rheometer's 20 mm barrel, which is held at a die test temperature of 75° C. A preheated to die test temperature, 60 g sample of the polymer melt composition is loaded into the barrel section of the rheometer. Rid the sample of any entrapped air. Push the sample from the barrel through the capillary die at a set of chosen rates 1,000-10,000 seconds$^{-1}$. An apparent shear viscosity can be calculated with the rheometer's software from the pressure drop the sample experiences as it goes from the barrel through the capillary die and the flow rate of the sample through the capillary die. The log (apparent shear viscosity) can be plotted against log (shear rate) and the plot can be fitted by the power law, according to the formula $\eta = K\gamma^{n-1}$, wherein K is the material's viscosity constant, n is the material's thinning index and $\gamma$ is the shear rate. The reported apparent shear viscosity of the composition herein is calculated from an interpolation to a shear rate of 3,000 sec$^{-1}$ using the power law relation.

Basis Weight Test Method

Basis weight of a fibrous structure is measured on stacks of twelve usable units using a top loading analytical balance with a resolution of ±0.001 g. The balance is protected from air drafts and other disturbances using a draft shield. A precision cutting die, measuring 3.500 in ±0.0035 in by 3.500 in ±0.0035 in is used to prepare all samples. With a precision cutting die, cut the samples into squares. Combine the cut squares to form a stack twelve samples thick. Measure the mass of the sample stack and record the result to the nearest 0.001 g.

The Basis Weight is calculated in lbs/3000 ft$^2$ or g/m$^2$ as follows:

Basis Weight=(Mass of stack)/[(Area of 1 square in stack)×(No. of squares in stack)]

For example,

Basis Weight (lbs/3000 ft$^2$)=[[Mass of stack (g)/ 453.6 (g/lbs)]/[12.25 (in$^2$)/144(in$^2$/ft$^2$)×12]]× 3000 or,

Basis Weight (g/m$^2$)=Mass of stack (g)/[79.032 (cm$^2$)/10,000 (cm$^2$/m$^2$)×12]

Report result to the nearest 0.1 lbs/3000 ft$^2$ or 0.1 g/m$^2$. Sample dimensions can be changed or varied using a similar precision cutter as mentioned above, so as at least 100 square inches of sample area in stack.

Initial Total Wet Tensile Test Method

Cut tensile strips precisely in the direction indicated; four to the machine direction (MD) and four to the cross direction (CD). Cut the sample strips 4 in. (101.6 mm) long and exactly 1 in. (25.4 mm) wide using an Alpha Precision Sample Cutter Model 240-7A (pneumatic): Thwing-Albert Instrument Co and an appropriate die.

An electronic tensile tester (Thwing-Albert EJA Vantage Tester, Thwing-Albert Instrument Co., 10960 Dutton Rd., Philadelphia, Pa., 19154) is used and operated at a crosshead speed of 4.0 inch (about 10.16 cm) per minute, using a strip of a fibrous structure of 1 inch wide and a length of about 4 inches long. The gauge length is set to 1 inch. The strip is inserted into the jaws with the 1 inch wide section in the clamps, verifying that the sample is hanging straight into the bottom jaw. The sample is then pre-loaded with 20-50 g/in of pre-load force. This tension is applied to the web to define the adjusted gauge length, and, by definition is the zero strain point. The sample is then wet thoroughly with water using a syringe to gently apply the water on the uppermost portion of the web sample inside the jaws. Crosshead movement is then initiated within 3-8 seconds after initial water contact. The initial result of the test is an array of data in the form load (grams force) versus crosshead displacement (centimeters from starting point).

The sample is tested in two orientations, referred to here as MD (machine direction, i.e., in the same direction as the continuously wound reel and forming fabric) and CD (cross-machine direction, i.e., 90° from MD). The MD and CD wet tensile strengths are determined using the above equipment and calculations in the following manner:

Initial Total Wet Tensile=ITWT (g$_f$/inch)=Peak Load$_{MD}$ (g$_f$)+Peak Load$_{CD}$ (g$_f$)

The Initial Total Wet Tensile value is then normalized for the basis weight of the strip from which it was tested. The normalized basis weight used is 24 g/m$^2$, and is calculated as follows:

Normalized {ITWT}={ITWT}*24 (g/m$^2$)/Basis Weight of Strip (g/m$^2$)

In one example, the initial total wet tensile of a polymeric structure, such as a fibrous structure, of the present invention is at least 1.18 g/cm (3 g/in) and/or at least 1.57 g/cm (4 g/in) and/or at least 1.97 g/cm (5 g/in) then the crosslinking system is acceptable. The initial total wet tensile may be less than or equal to about 23.62 g/cm (60 g/in) and/or less than or equal to about 21.65 g/cm (55 g/in) and/or less than or equal to about 19.69 g/cm (50 g/in).

Elongation/Tensile Strength/TEA/Tangent Modulus Test Method

Elongation (Stretch), Tensile Strength, TEA and Tangent Modulus are measured on a constant rate of extension tensile tester with computer interface (a suitable instrument is the EJA Vantage from the Thwing-Albert Instrument Co. Wet Berlin, N.J.) using a load cell for which the forces measured are within 10% to 90% of the limit of the load cell. Both the movable (upper) and stationary (lower) pneumatic jaws are fitted with smooth stainless steel faced grips, with a design suitable for testing 1 inch wide sheet material (Thwing-Albert item #733GC). An air pressure of about 60 psi is supplied to the jaws.

Eight usable units of fibrous structures are divided into two stacks of four usable units each. The usable units in each stack are consistently oriented with respect to machine direction (MD) and cross direction (CD). One of the stacks is designated for testing in the MD and the other for CD. Using a one inch precision cutter (Thwing-Albert JDC-1-10, or similar) take a CD stack and cut one, 1.00 in ±0.01 in wide by 3-4 in long stack of strips (long dimension in CD). In like fashion cut the remaining stack in the MD (strip's long dimension in MD), to give a total of 8 specimens, four CD and four MD strips. Each strip to be tested is one usable unit thick, and will be treated as a unitary specimen for testing.

Program the tensile tester to perform an extension test, collecting force and extension data at an acquisition rate of 20 Hz as the crosshead raises at a rate of 2.00 in/min (5.08 cm/min) until the specimen breaks. The break sensitivity is set to 80%, i.e., the test is terminated when the measured force drops to 20% of the maximum peak force, after which the crosshead is returned to its original position.

Set the gage length to 1.00 inch. Zero the crosshead and load cell. Insert the specimen into the upper and lower open grips such that at least 0.5 inches of specimen length is contained in each grip. Align specimen vertically within the upper and lower jaws, then close the upper grip. Verify specimen is aligned, then close lower grip. The specimen should be fairly straight between grips, with no more than 5.0 g of force on the load cell. Add a pre-tension force of 3 g. This tension is applied to the specimen to define the adjusted gauge length, and, by definition is the zero strain point. Start the tensile tester and data collection. Repeat testing in like fashion for all four CD and four MD specimens. Program the software to calculate the following from the constructed force (g) versus extension (in) curve.

Eight samples are run on the Tensile Tester (four to the MD and four to the CD) and average of the respective Total Dry Tensile, Fail TEA and Fail Stretch is reported as the Total Dry Tensile, Fail TEA and Fail Stretch. Fail TEA is defined as tensile energy absorbed (area under the load vs. strain tensile curve) from zero strain to fail force point, with units of g/in. Fail Stretch is defined as the percentage strain measured after the web is strained past its peak load point, where the force drops to exactly 50% of its peak load force.

The Fail TEA is then divided by the basis weight of the strip from which it was tested to arrive at the TEA of the present invention, and is calculated as follows:

TEA=Fail TEA/Basis Weight of Strip (g/m2)

The MD and CD dry tensile strengths are determined using the above equipment and calculations in the following manner.

Dry Tensile Strength in general is the maximum peak force (g) divided by the specimen width (1 in), and reported as g/in to the nearest 1 Win.

Average Dry Tensile Strength=sum of tensile loads measures (MD)/(Number of tensile stripes tested (MD)*Number of useable units or plys per tensile stripe)

This calculation is repeated for cross direction testing.

Total Dry Tensile (TDT)=Average MD tensile strength+Average CD tensile strength

The Total Dry Tensile value is then normalized for the basis weight of the strip from which it was tested. The normalized basis weight used is 24 g/m², and is calculated as follows:

Normalized {TDT}={TDT}*24 (g/m²)/Basis Weight of Strip (g/m²)

The various values are calculated for the four CD specimens and the four MD specimens. Calculate an average for each parameter separately for the CD and MD specimens.

Polymer Melt Composition pH Test Method

A polymer melt composition pH is determined by adding 25 mL of the polymer melt composition to 100 mL of deionized water, stifling with a spatula for 1 min and measuring the pH.

Molecular Weight and Molecular Weight Distribution Test Method

The weight average molecular weight and the molecular weight distribution (MWD) of a a material, such as a polymer and/or an acrylamide-based copolymer, are determined by Gel Permeation Chromatography (GPC) using a mixed bed column. The column (Waters linear ultrahydrogel, length/ID: 300×7.8 mm) is calibrated with a narrow molecular weight distribution polysaccharide, 47,100 g/mol from Polymer Laboratories). The calibration standards are prepared by dissolving 0.024 g of polysaccharide and 6.55 g of the mobile phase in a scintillation vial at a concentration of 4 mg/ml. The solution sits undisturbed overnight. Then it is gently swirled and filtered with a 5 micron nylon syringe filter into an auto-sampler vial.

The polymer and/or acrylamide-based copolymer sample for determination of weight average molecular weight and MWD is prepared by diluting the polymer to 1000 ppm in deionized water. The sample is then filtered through with a 5 micron nylon syringe filter. The filtered sample solution is taken up by the auto-sampler to flush out previous test materials in a 100 µL injection loop and inject the present test material into the column. The column is held at 50° C. using a Waters TCM column heater. The sample eluded from the column is measured against the mobile phase background by a differential refractive index detector (Wyatt Optilab DSP interferometric refractometer) and a multi-angle later light scattering detector (Wyatt DEAWN EOS 18 angle laser light detector) held at 50° C. The mobile phase is water with 0.03M potassium phosphate, 0.2M sodium nitrate, and 0.02% sodium azide. The flowrate is set at 0.8 mL/min with a run time of 35 minutes.

If an acrylamide-based copolymer is present in a fibrous structure, then first obtain the acrylamide-based copolymer from the web as follows:

1 g of a fibrous structure is cut into small pieces using a standard food grinder. The grinded fibrous structure pieces are then placed into a 30 mL pressure tube with 20 g of deionized water. The pH is adjusted to between 6.8 and 7.2 using 0.1N NaOH, followed by addition of 1500 ppm $CaCl_2$ and 100 µL of α-amylase from *bacillus amyloliquefaciens* to the pressure tube. The pressure tube is sealed, inverted a few times to disperse the fibrous structure, and placed in a recirculating oven held at 95° C. for 4 hour. After the sample is removed from the oven and cooled, the reaction is filtered. The enzyme reaction breaks up any crosslinked and uncrosslinked hydroxyl polymer molecules, such as starch molecules, to very low molecular weight, while retaining the acrylamide-based copolymer molecular weight since the carbon-carbon polymer backbone in the acrylamide-based copolymer is not susceptible to reaction with the enzyme. GPC is performed on the aqueous solution formed as described above.

Elongation at Rupture Test Method:

The fibrous structure is conditioned at 50% relative humidity and 23° C. until fully equilibrated, at least for 21 days. All subsequent steps are done under the same environmental conditions. Filaments of sufficient length are isolated from the nonwoven to be tested. The isolated filaments should not be birefringent, i.e. should not be stretched beyond their yield point before measurement. Care is taken not to damage the filaments during the isolation. Filaments are tested using a Favimat tensile tester (Textechno Herbert Stein GmbH & Co. KG, Mönchengladbach, Germany), equipped with a 210 cN load cell with a resolution of $10^{-4}$ cN. Test parameters are set as follows: Gauge length=1 mm, test speed=10 mm/min, drop off force=95% of maximum. Tests where multiple filaments had been tested, as indicated by a stepwise drop off of force, need to be discarded. The average value for Elongation at Rupture is reported.

Relative Humidity Test Method

Relative humidity is measured using wet and dry bulb temperature measurements and an associated psychometric chart. Wet bulb temperature measurements are made by placing a cotton sock around the bulb of a thermometer. Then the thermometer, covered with the cotton sock, is placed in hot water until the water temperature is higher than an anticipated wet bulb temperature, more specifically, higher than about 82° C. (about 180° F.). The thermometer is placed in the attenuating air stream, at about 3 millimeters (about ⅛ inch) from the extrusion nozzle tips. The temperature will initially drop as the water evaporates from the sock. The temperature will plateau at the wet bulb temperature and then will begin to climb once the sock loses its remaining water. The plateau temperature is the wet bulb temperature. If the temperature does not decrease, then the water is heated to a higher temperature. The dry bulb temperature is measured using a 1.6 mm diameter J-type thermocouple placed at about 3 mm downstream from the extrusion nozzle tip.

Based on a standard atmospheric psychometric chart or an Excel plug-in, such as for example, "MoistAirTab" manufactured by ChemicaLogic Corporation, a relative humidity is determined. Relative Humidity can be read off the chart, based on the wet and dry bulb temperatures.

Average Diameter Test Method

A fibrous structure comprising fibrous elements of appropriate basis weight (approximately 5 to 20 grams/square meter) is cut into a rectangular shape, approximately 20 mm by 35 mm. The sample is then coated using a SEM sputter coater (EMS Inc, PA, USA) with gold so as to make the fibers relatively opaque. Typical coating thickness is between 50 and 250 nm. The sample is then mounted between two standard microscope slides and compressed together using small binder clips. The sample is imaged using a 10× objective on an Olympus BHS microscope with the microscope light-collimating lens moved as far from the objective lens as possible. Images are captured using a Nikon D1 digital camera. A Glass microscope micrometer is used to calibrate the spatial distances of the images. The approximate resolution of the images is 1 μm/pixel. Images will typically show a distinct bimodal distribution in the intensity histogram corresponding to the fibers and the background. Camera adjustments or different basis weights are used to achieve an acceptable bimodal distribution. Typically 10 images per sample are taken and the image analysis results averaged.

The images are analyzed in a similar manner to that described by B. Pourdeyhimi, R. and R. Dent in "Measuring fiber diameter distribution in nonwovens" (Textile Res. J. 69(4) 233-236, 1999). Digital images are analyzed by computer using the MATLAB (Version. 6.1) and the MATLAB Image Processing Tool Box (Version 3.) The image is first converted into a grayscale. The image is then binarized into black and white pixels using a threshold value that minimizes the intraclass variance of the thresholded black and white pixels. Once the image has been binarized, the image is skeltonized to locate the center of each fiber in the image. The distance transform of the binarized image is also computed. The scalar product of the skeltonized image and the distance map provides an image whose pixel intensity is either zero or the radius of the fiber at that location. Pixels within one radius of the junction between two overlapping fibers are not counted if the distance they represent is smaller than the radius of the junction. The remaining pixels are then used to compute a length-weighted histogram of fiber diameters contained in the image.

Degradation of Fibrous Structure Test Method

Approximately 2 g of a fibrous structure comprised of a filament-forming polymer, such as starch, and an acrylamide-based copolymer is placed into a 30 mL pressure tube with 14 g of 1N HCl, and heated to 130° C. for 45 minutes. The solution is filtered through a glass microfiber with 1 μm pore size, and neutralized to pH 7 with sodium bicarbonate. Assuming no loss of the non-hydroxyl polymer, the solution is run through a gel permeation chromatography column using the Weight Average Molecular Weight Method with the following changes:

Samples are injected, without dilution, after being filtered with a Whatman GD/X nylon, 5 μm syringe filter. The column used is a Waters Linear Ultrahydrogel (molecular weight ranges from 100 to 7,000,000 g/mol) measuring 7.8×300 mm. The column temperature is 50° C. and the injection volume is 1004 The aqueous mobile phase contains 0.03M potassium phosphate, 0.2M sodium nitrate and 0.02% sodium azide. The mobile phase is adjusted to pH7 with sodium hydroxide. Run time is 25 minutes.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A spun filament comprising an interpenetrating network structure comprising a filament-forming polymer and an acrylamide-based copolymer comprising a polymer backbone that comprises two or more different monomeric units, at least one of which is an acrylamide monomeric unit and at least one of which is a monomeric unit selected from the group consisting of: pendant hydroxyl-containing monomeric units, pendant hydroxyl alkylether-containing monomeric units, pendant hydroxyl alkylester-containing monomeric units, pendant hydroxyl alkylamide-containing monomeric units, and mixtures thereof.

2. The spun filament according to claim 1 wherein the acrylamide monomeric unit has the following Formula I:

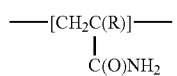

wherein R is independently selected from the group consisting of: H and $C_1$-$C_3$ alkyl.

3. The spun filament according to claim 1 wherein the pendant hydroxyl-containing monomeric unit has the following Formula II:

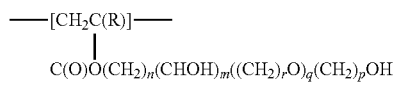

wherein R is independently selected from the group consisting of: H and $C_1$-$C_3$ alkyl, n is from 1-10, m is from 0 to 4, p is from 0 to 10, q is from 0 to 10, and r is from 1-4.

4. The spun filament according to claim 1 wherein the pendant hydroxyl-containing monomeric unit has the following Formula III:

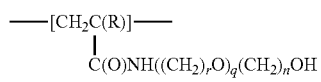

wherein R is independently selected from the group consisting of: H and $C_1$-$C_3$ alkyl, n is from 1-10, q is from 0 to 10, and r is from 1-4.

5. The spun filament according to claim 1 wherein the pendant hydroxyl alkylether-containing monomeric unit has the following Formula IV:

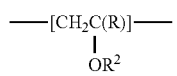

wherein R is independently selected from the group consisting of: H and $C_1$-$C_3$ alkyl, n is from 1-10, and $R^2$ is a linear or branched, hydroxyl-containing $C_1$-$C_{12}$ hydrocarbon.

6. The spun filament according to claim 1 wherein the pendant hydroxyl alkylester-containing monomeric unit has the following Formula V:

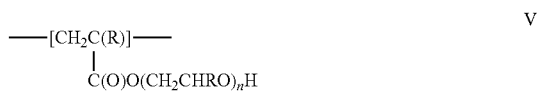

wherein R is independently selected from the group consisting of: H and $C_1$-$C_3$ alkyl, n is from 1-10.

7. The spun filament according to claim 1 wherein the pendant hydroxyl alkylamide-containing monomeric unit has the following Formula VI:

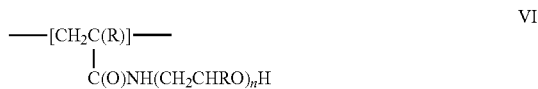

wherein R is independently selected from the group consisting of: H and $C_1$-$C_3$ alkyl, n is from 1-10.

8. The spun filament according to claim 1 wherein the filament comprises from about 0.001% to about 10% by weight of the filament of the acrylamide-based copolymer.

9. The spun filament according to claim 1 wherein the filament-forming polymer comprises a hydroxyl polymer.

10. The spun filament according to claim 9 wherein the hydroxyl polymer comprises a polysaccharide.

11. The spun filament according to claim 10 wherein the polysaccharide is selected from the group consisting of: starch, starch derivatives, starch copolymers, chitosan, chitosan derivatives, chitosan copolymers, cellulose, cellulose derivatives, cellulose derivatives, cellulose copolymers, hemicelluloses, hemicelluloses derivatives, hemicelluloses copolymers, and mixtures thereof.

12. The spun filament according to claim 1 wherein the spun filament exhibits an Elongation at Rupture of greater than 55% as measured according to the Elongation at Rupture Test Method.

13. A fibrous structure comprising a plurality of spun filaments according to claim 1.

14. A fibrous structure comprising a plurality of spun filaments according to claim 12.

15. A fibrous structure comprising a plurality of spun filaments according to claim 1 wherein the fibrous structure exhibits a Fail TEA of greater than 37 g/in as measured according to the Tensile Test Method.

16. The fibrous structure according to claim 15 wherein the filament-forming polymer comprises a hydroxyl polymer.

17. A single- or multi-ply sanitary tissue product comprising a fibrous structure according to claim 15.

18. A method for making a spun filament according to claim 12 wherein the method comprises the steps of:
 a. providing a filament-forming composition comprising said filament-forming polymer and said acrylamide-based copolymer comprising two or more different monomeric units, at least one of which is an acrylamide monomeric unit and at least one of which is a monomeric unit selected from the group consisting of: pendant hydroxyl-containing monomeric units, pendant hydroxyl alkylether-containing monomeric units, pendant hydroxyl alkylester-containing monomeric units, pendant hydroxyl alkylamide-containing monomeric units, and mixtures thereof; and b. producing a spun filament from the filament-forming composition.

\* \* \* \* \*